United States Patent
Kozu

(10) Patent No.: US 8,386,203 B2
(45) Date of Patent: Feb. 26, 2013

(54) METHOD AND DEVICE FOR EVALUATING GRADUATED REFRACTION POWER LENS AND METHOD FOR MANUFACTURING GRADUATED REFRACTION POWER LENS

(75) Inventor: Kazuma Kozu, Tokyo (JP)

(73) Assignee: Hoya Corporation, Tokyo (JP)

( * ) Notice: Subject to any disclaimer, the term of this patent is extended or adjusted under 35 U.S.C. 154(b) by 367 days.

(21) Appl. No.: 12/675,301

(22) PCT Filed: Aug. 29, 2008

(86) PCT No.: PCT/JP2008/065583
§ 371 (c)(1), (2), (4) Date: Feb. 25, 2010

(87) PCT Pub. No.: WO2009/028685
PCT Pub. Date: Mar. 5, 2009

(65) Prior Publication Data
US 2010/0250173 A1  Sep. 30, 2010

(30) Foreign Application Priority Data
Aug. 31, 2007 (JP) ................................. 2007-227197

(51) Int. Cl.
*G06F 19/00* (2011.01)
(52) U.S. Cl. ............... 702/82; 702/35; 702/60; 702/185; 703/6; 703/7; 703/1; 703/2; 706/904; 706/912; 706/924; 700/95; 700/97; 356/124; 356/124.5; 356/127
(58) Field of Classification Search ............... 702/82, 702/35, 60, 185; 703/6, 7, 1, 2; 706/904, 706/912, 924; 700/95, 97; 356/124, 124.5, 356/127; 351/154, 158, 169, 177
See application file for complete search history.

(56) References Cited

U.S. PATENT DOCUMENTS

| 6,199,984 B1* | 3/2001 | Menezes ..................... 351/169 |
| 6,222,621 B1 | 4/2001 | Taguchi | |
| 2002/0001063 A1* | 1/2002 | Yanari ......................... 351/169 |
| 2004/0109134 A1* | 6/2004 | Sato et al. ..................... 351/168 |

(Continued)

FOREIGN PATENT DOCUMENTS

| JP | 8 247896 | 9/1996 |
| JP | 8 304228 | 11/1996 |

(Continued)

OTHER PUBLICATIONS

U.S. Appl. No. 12/675,421, filed Feb. 26, 2010, Kozu.

*Primary Examiner* — Carol Tsai
(74) *Attorney, Agent, or Firm* — Oblon, Spivak, McClelland, Maier & Neustadt, L.L.P.

(57) ABSTRACT

An evaluation method of a progressive-addition lens is provided. First, powers of the progressive-addition lens at a plurality of measurement points are measured to obtain an actually measured power distribution. Next, a comparison power distribution created based on the actually measured power distribution and a defective power distribution prepared in advance are compared with each other to perform similarity search between the both. Thereafter, whether or not the comparison power distribution and the defective power distribution are similar to each other is determined based on the result of the similarity search step, and if it is determined that the comparison power distribution and the defective power distribution are similar to each other, then the progressive-addition lens is evaluated as defective.

8 Claims, 14 Drawing Sheets

U.S. PATENT DOCUMENTS

2004/0257527 A1  12/2004  Qi et al.
2005/0052615 A1*  3/2005  Wang et al. .................. 351/168
2005/0179863 A1  8/2005  Taguchi et al.

FOREIGN PATENT DOCUMENTS

| | | |
|---|---|---|
| JP | 9 96784 | 4/1997 |
| JP | 10 507825 | 7/1998 |
| JP | 2000 186978 | 7/2000 |
| JP | 3617004 | 2/2005 |
| JP | 2006 292687 | 10/2006 |
| WO | 03 098181 | 11/2003 |
| WO | 2004 034131 | 4/2004 |

* cited by examiner

CLOCKWISE-SHIFT

COUNTERCLOCKWISE-SHIFT

UP-SHIFT

DOWN-SHIFT

RIGHT-SHIFT

LEFT-SHIFT

US 8,386,203 B2

METHOD AND DEVICE FOR EVALUATING GRADUATED REFRACTION POWER LENS AND METHOD FOR MANUFACTURING GRADUATED REFRACTION POWER LENS

TECHNICAL FIELD

The present invention relates to a method and a device for evaluating a progressive-addition lens (i.e., a graduated refraction power lens) and a method for manufacturing a progressive-addition lens. Particularly, the present invention relates to a method and a device for evaluating a bi-aspherical type progressive-addition lens and a method for manufacturing a bi-aspherical type progressive-addition lens.

BACKGROUND ART

When manufacturing/processing a spectacle lens, it is necessary to evaluate the obtained spectacle lens to see whether or not the both optical surfaces thereof have the required optical performance and surface shape set forth in the applicable specification or design. The spectacle lens evaluation is mainly performed by measuring the optical characteristics at measurement point(s) of the lens. Generally, if the spectacle lens is a single-vision lens, then an optical center is selected as the measurement point; if the spectacle lens is a multi-focal lens, then a distance portion optical center and positions for measuring addition power (i.e., a distance portion vertex power measurement point and a near portion reference point) are selected as the measurement points; and if the spectacle lens is a progressive-addition lens, then a distance portion reference point and positions for measuring addition power (i.e., a distance portion reference point and a near portion design reference point) are selected as the measurement points.

Incidentally, measuring methods for measuring the optical characteristics of various kinds of spectacle lenses (the single-vision spectacle lens, the multi-focal spectacle lens and the progressive-addition lens) and allowance for measured value are specified in ISO (International Organization for Standardization), JIS (Japanese Industrial Standards) and the like.

However, since the wearer of the spectacle lens also sees things through the region other than the measurement point(s) of the lens, there is a desire to develop an evaluation method in which the lens is evaluated in a wide region, instead of being evaluated at the aforesaid measurement point(s) only. For example, it is important to evaluate the lens in a wide region particularly in the case where one or both surfaces of the lens have complicated surface shape, such as a progressive-addition lens.

In most conventional progressive-addition lens, a surface on the object side (a front surface of the lens) is formed as a "progressive-power surface", and a surface on the eyeball side (a back surface of the lens) is formed as a "spherical surface" or an "astigmatic surface". However, recently there is developed a bi-aspherical type progressive-addition lens whose both surfaces (the front surface and the back surface of the lens) are formed as aspheric surfaces, and the progressive-power is obtained by combining the both surfaces (see, for example, Japanese Patent Registration No. 3617004 Feb. 2, 2005).

Further, as prior arts, it is proposed that the lens is evaluated by actually measuring a three-dimensional shape of the lens surface, and the optical characteristics are calculated based on the three-dimensional shape (see, for example, Japanese Patent Registration No. 3617004 and Published Japanese Translation of PCT International Publication for Patent Application Publication No. H10-507825 Jul. 28, 1998). Further, it is also proposed to provide a method and device to measure the optical characteristics, such as a dioptric power distribution (referred to as a "power distribution" hereinafter), of the lens in a wide region (see Japanese Unexamined Patent Application Publication No. H08-304228 Nov. 22, 1996), and evaluate the optical characteristics of the lens based on a difference distribution between a measured power distribution in a wide region and a power distribution obtained based on design data (see Japanese Unexamined Patent Application Publication No. 2000-186978 Jul. 4, 2000).

Further, since a mold used for molding the spectacle plastic lens is formed of glass whose molding surface is transferred to the plastic lens, the molding surface of the mold has to be formed with the same accuracy as that of the surface of the spectacle lens. Thus, in the case where the mold is formed to be conformed to the shape of the lens, the mold can be evaluated in the same manner as the spectacle lens.

However, in the bi-aspherical type progressive-addition lens disclosed in Japanese Patent Registration No. 3617004, not only the shape of the both surfaces (the front surface and the back surface) needs to be finished according to pertinent design, but also the front surface and the back surface need to be combined correctly in position. If a relative positional shift (including positional shift in up/down/left/right directions, rotational shift, and the combination thereof) is generated between the front surface and the back surface, the influence thereof may be exerted on the optical performance depending on the degree of the positional shift.

An object of the present invention is to provide a method for easily evaluating whether or not the relative positional shift generated between the both surfaces is within an allowable range during the manufacturing process of the bi-aspherical type lens.

DISCLOSURE OF THE INVENTION

A method for evaluating a progressive-addition lens according to an aspect of the present invention includes: a power distribution measuring step in which powers of the progressive-addition lens at a plurality of points are measured to obtain an actually measured power distribution; a similarity search step in which a comparison power distribution created based on the actually measured power distribution and a defective power distribution prepared in advance are compared with each other to perform similarity search between the comparison power distribution and the defective power distribution; and an evaluation step in which whether or not the comparison power distribution and the defective power distribution are similar to each other is determined based on the result of the similarity search step, and if it is determined that the comparison power distribution and the defective power distribution are similar to each other, then the progressive-addition lens is evaluated as defective.

A device for evaluating a progressive-addition lens according to another aspect of the present invention includes: a power distribution measuring device for measuring powers of the progressive-addition lens at a plurality of measurement points to obtain an actually measured power distribution; and an evaluation computer having a defective power distribution storage for storing a defective power distribution prepared in advance and a processor for evaluating the progressive-addition lens using the actually measured power distribution and the defective power distribution. The processor of the evaluation computer performs: a process for creating a comparison power distribution based on the actually measured power distribution; a process for comparing the comparison power distribution and the defective power distribution with each other to perform similarity search between the comparison power distribution and the defective power distribution; and a process in which whether or not the comparison power distribution and the defective power distribution are similar to each other is determined based on the result of the similarity search, and if it is determined that the comparison power distribution and the defective power distribution are similar to each other, then the progressive-addition lens is evaluated as defective.

A method for manufacturing a progressive-addition lens according to further another aspect of the present invention includes: a step for optically finishing optically-unfinished surface(s) of a lens blank to form a progressive-addition lens; and a lens evaluation step for evaluating whether a defect of the combination of a front surface and a back surface of the progressive-addition lens is within an allowance or not. The lens evaluation step includes: a power distribution measuring step in which powers of the progressive-addition lens at a plurality of points are measured to obtain an actually measured power distribution; a similarity search step in which a comparison power distribution created based on the actually measured power distribution and a defective power distribution prepared in advance are compared with each other to perform similarity search between the comparison power distribution and the defective power distribution; and an evaluation step in which whether or not the comparison power distribution and the defective power distribution are similar to each other is determined based on the result of the similarity search step, and if it is determined that the comparison power distribution and the defective power distribution are similar to each other, then the progressive-addition lens is evaluated as defective.

According to the present invention, it is possible to quickly and precisely evaluate whether or not the bi-aspherical type progressive-addition lens has a defect. Further, the cause of the defect of the lens can be easily identified.

BEST MODES FOR CARRYING OUT THE INVENTION

The inventor of the present invention is focused on a pattern of the difference (referred to as a "difference distribution" hereinafter) between a transmission power distribution (referred to as an "actually measured power distribution" hereinafter) and a previously designed ideal power distribution (referred to as a "calculation power distribution" hereinafter) of the bi-aspherical type progressive-addition lens. Further, by observing the difference distributions of a large number of bi-aspherical type progressive-addition lenses manufactured so that the position of the both surfaces thereof is intentionally shifted from each other, the inventor of the present invention finds that each of the difference distributions of the respective lenses has a particular error pattern depending on the type of the shift.

The best embodiment of the present invention is described below based on this finding. It should be understood that this embodiment is merely an example of the present invention, and various modifications can be made without departing from the spirit and scope of the present invention.

[Spectacle Lens Evaluation Device]

First, a spectacle lens evaluation device according to an embodiment of the present invention is described below with reference to FIG. 1.

Figure 1:
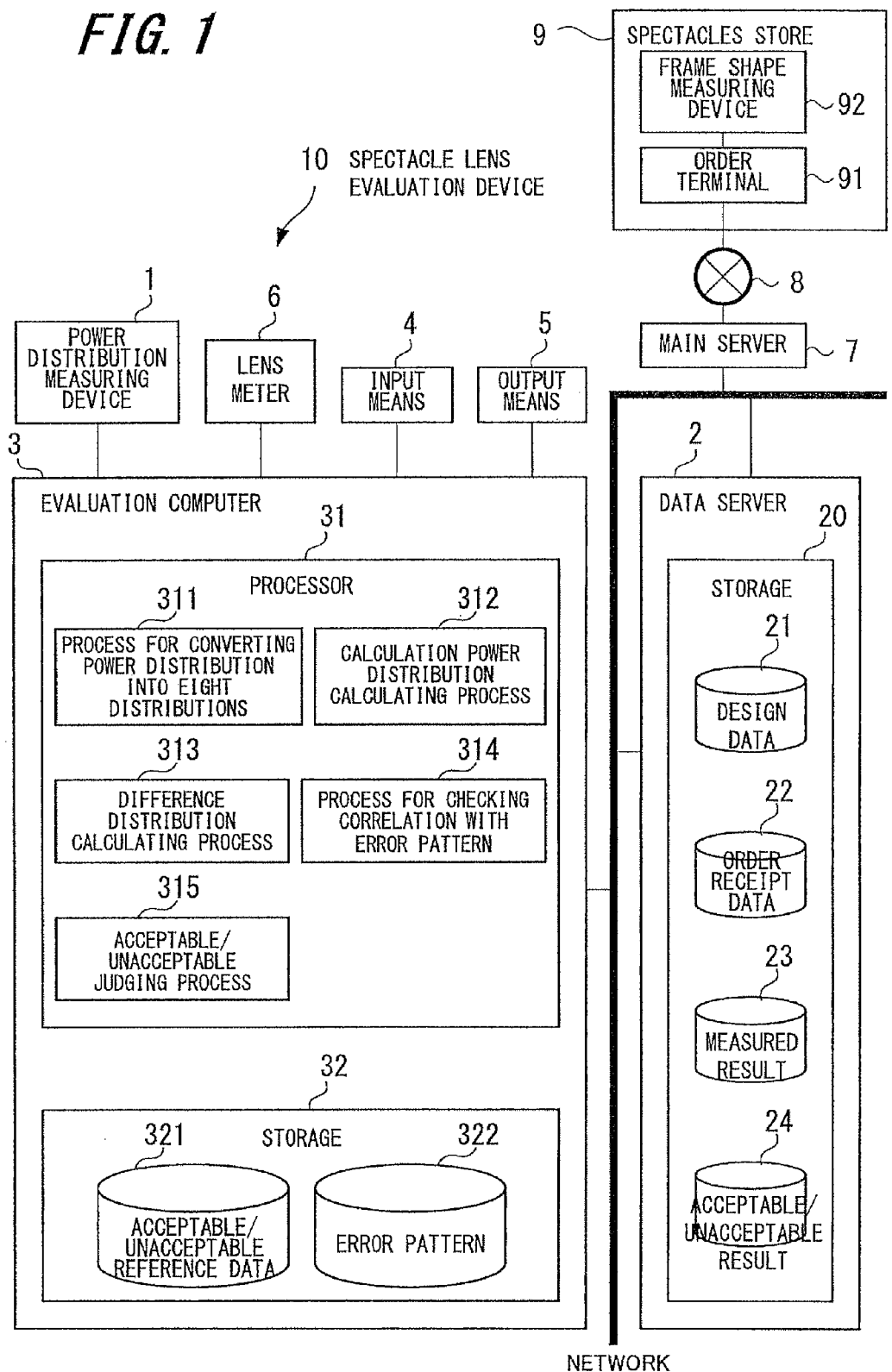
FIG. 1 is a block diagram showing a schematic configuration of a spectacle lens evaluation device according to an embodiment of the present invention.

FIG. 1 is a block diagram showing a schematic configuration of the spectacle lens evaluation device according to the present embodiment.

A spectacle lens evaluation device 10 according to the present embodiment includes a power distribution measuring device 1, a data server 2, an evaluation computer 3, an input means 4, an output means 5 and a lens meter 6. The lens meter 6 measures the power of a spectacle lens (i.e., a lens-to-be-measured) on a spot-by-spot basis.

Figure 2:
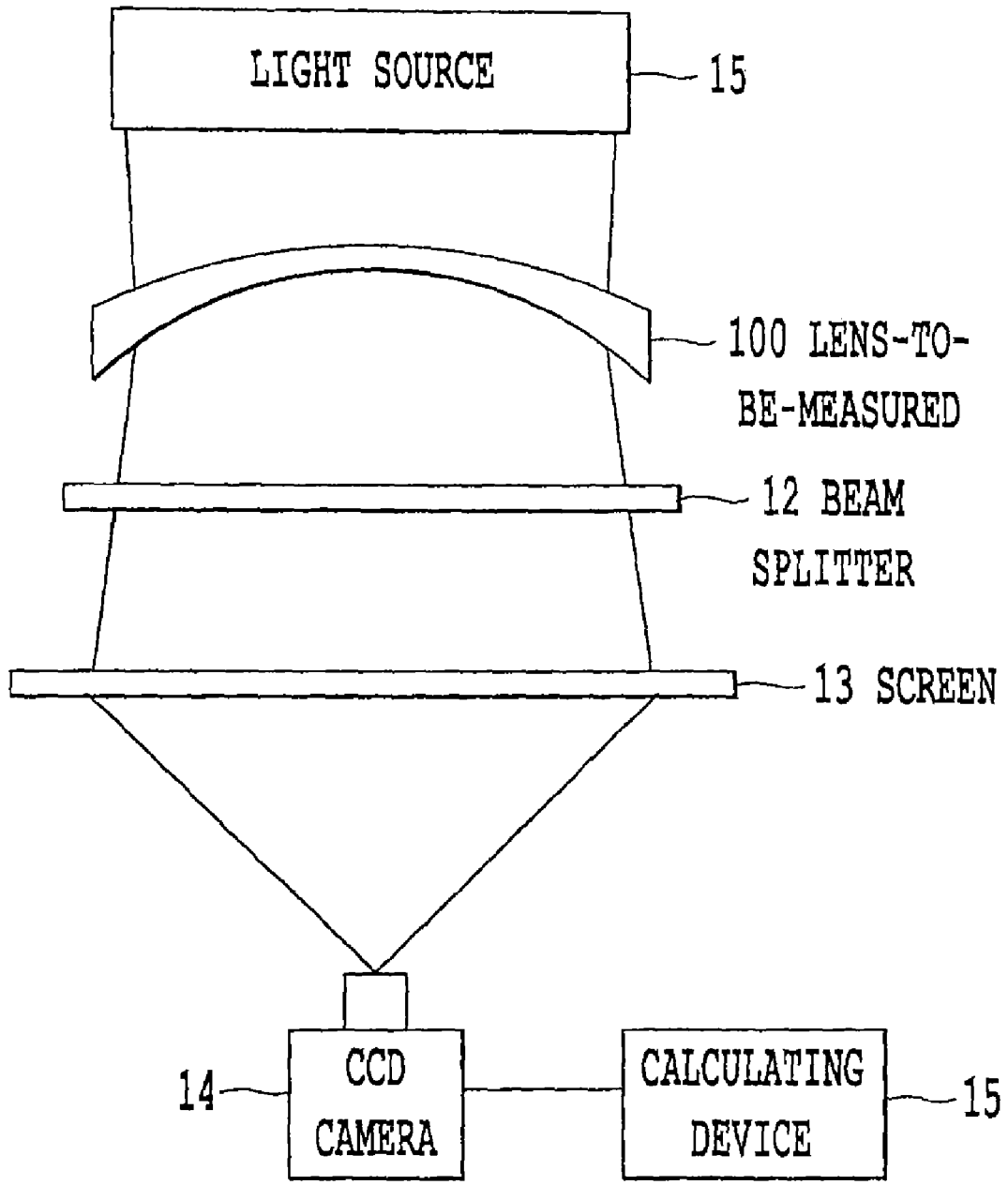
FIG. 2 is a view showing a schematic configuration of a power distribution measuring device according to the embodiment of the present invention.

The power distribution measuring device 1 is a device for measuring the power distribution of the lens-to-be-measured. A schematic configuration of the power distribution measuring device 1 will be described below with reference to FIG. 2. FIG. 2 is a view showing the schematic configuration of the power distribution measuring device 1.

Any conventional measuring device can be used as the power distribution measuring device 1 as long as the measuring device can measure spherical power S, cylindrical power C and cylinder axis Ax at many points of the lens-to-be-measured 100. An example of the power distribution measuring device is shown in FIG. 2. The power distribution measuring device 1 includes a light source device 11, a beam splitter 12, a screen 13, a CCD camera 14 and a calculating device 15. The light source device 11 irradiates the lens-to-be-measured 100 with parallel light. The beam splitter 12 is disposed on one side of the light source device 11 with the lens-to-be-measured 100 sandwiched in between, and has a plurality of light transmitting holes (not shown) formed therein.

The beam splitter 12 has one surface facing the lens-to-be-measured 100 and the other surface opposite to the one surface, and the screen 13 faces the other surface of the beam splitter 12. The light passing through the beam splitter 12 reaches the screen 13. The CCD camera 14 takes an image displayed on the screen 13. The calculating device 15 measures the path of the light passing through the lens-to-be-measured 100 based on the image taken by the CCD camera 14, and calculates the optical characteristics of the lens-to-be-measured 100. The evaluation computer 3 shown in FIG. 1 may also be used as the calculating device 15.

When the light source device 11 irradiates the lens-to-be-measured 100 with parallel light, light is emitted from the lens-to-be-measured 100. The light emitted from the lens-to-be-measured 100 passes through the beam splitter 12 to be projected on the screen 13. The calculating device 15 measures the path of the light passing through the lens-to-be-measured 100 based on the light (image) projected on the screen 13, and calculates the optical characteristics of the lens-to-be-measured 100.

Next, the power distribution measuring device 1 shown in FIG. 1 will be described below again. The data server 2 is a computer having a data storing means, and is connected to the evaluation computer 3 via a network. Incidentally, the power distribution measuring device 1 and the data server 2 may also be directly connected to each other through a communication media such as a communication cable. The data server 2 has a storage 20 for storing data necessary for evaluating the lens-to-be-measured 100 and evaluation results of the lens-to-be-measured 100.

The storage 20 has a design data storing section 21, an order receipt data storing section 22, a measured result storing section 23 and an acceptable/unacceptable judgment result storing section 24. The design data storing section 21 stores the design data of the lens-to-be-measured 100 in advance, and the order receipt data storing section 22 stores the order receipt data in advance. The measured result storing section 23 stores the measured result data such as various kinds of measured results and the calculated results obtained by the power distribution measuring device 1 and the lens meter 6. The acceptable/unacceptable judgment result storing section 24 stores acceptable/unacceptable result data which represents acceptable/unacceptable result of the lens judged by the evaluation computer 3.

The data server 2 is connected to a main server 7 of a factory via a network. Incidentally, the main server 7 and the data server 2 may also be directly connected to each other through a communication media such as a communication cable. The main server 7 is connected to an order terminal 91 of a spectacles store 9 through a communication media 8. The present embodiment is described using an example in which the factory (which manufactures the lens) receives an online order from a customer such as a spectacles store (which orders the lens). The communication media 8 is not particularly limited. The communication media 8 can be, for example, a public communication line, an exclusive line, the internet and the like.

The spectacles store 9 is provided with the aforesaid order terminal 91 and a frame shape measuring device 92. The frame shape measuring device 92 is a device for measuring the shape of the spectacle frame. The order terminal 91 is a computer terminal for transmitting various information necessary for ordering spectacle lenses to the factory of the lens manufacturer. When the order data is transmitted from the order terminal 91 to the main server 7 in the factory, an order reception process is performed by an order reception processing program registered in the main server 7, and order receipt data is created. The created order receipt data is stored in the order receipt data storing section 22 of the data server 2.

The order receipt data includes lens information, spectacle frame information, prescribed values, layout information and the like. The lens information includes information about lens type (for example, lens material, refractive index, optical design of the front surface and back surface of the lens and the like) and information about lens processing instruction (for example, lens thickness, edge thickness, eccentricity, processing method of edge face, processing type of frame fitting portion, dyeing, coating and the like).

Further, the spectacle frame information includes frame size, frame material, frame color, edge shape and the like. Herein, the edge shape means data indicating the shape of the lens frame measured by the frame shape measuring device 92 and data indicating a preset edge shape in the case of, for example, a rimless frame or a Nylol frame. Further, the prescribed values include spherical power, cylindrical power, cylinder axis, prism, addition power and the like. The layout information includes pupillary distance, pupillary distance of each of both eyes, near pupillary distance, segment position, eye point position and the like.

The main server 7 in the factory is provided with a lens design program for designing lens shape. The main server 7 executes the lens design program to calculate a desired lens shape (i.e., data related to lens front surface shape, data related to lens back surface shape, data related to arrangement of the front surface and back surface of the lens, data related to edge shape, and the like) base on the order receipt data and the data necessary for designing the lens (i.e., the optical surface shape, the edge shape and the like) previously stored in the storage 20. The calculated lens shape, as design data, is stored in the design data storing section 21 of the data server 2.

In other words, the design value of the lens-to-be-measured 100 is determined based on the design data and the order receipt data. Further, the design data includes three-dimensional shape data of the front surface (the surface far from the eye of the wearer) and the back surface (the surface near from the eye of wearer) of the lens-to-be-measured 100; data related to distance and arrangement of the front surface and back surface of the lens such as lens center thickness, prism and the like; and material parameters such as refractive index and Abbe's number (a number used for evaluating correction to chromatic aberration of an optical material) of the lens-to-be-measured 100. Incidentally, it is preferred that the three-dimensional shape data is functioned by a spline function.

Further, the main server 7 of the factory is provided with a processing data creating program for creating processing data of the lens. Based on the order receipt data and the design data, the main server 7 executes the processing data creating program to create the processing data in which various processing conditions of the lens manufacturing process (including, for example, blocking process, cutting process, polishing process, dyeing process, surface treatment process, edging process and the like) are set. The created processing data is stored in the storage 20 of the data server 2. Further, based on the order receipt data, the design data and the processing data, an uncut lens (a finished lens before edging) is manufactured, and the uncut lens is subjected to the surface treatment process, the edging process and the like according to necessity and then is delivered to the customer who places the order.

Based on the data stored in the storage 20 of the data server 2 and the data measured by the power distribution measuring device 1, the evaluation computer 3 performs evaluation on the lens-to-be-measured with respect to the design value. The evaluation computer 3 is not only connected to the power distribution measuring device 1, the lens meter 6, the input means 4 and the output means 5, but also connected to the data server 2 via a network.

The evaluation computer 3 has a processor 31, a storage 32, and interfaces (not shown) with the power distribution measuring device 1, the lens meter 6, the data server 2, the input means 4 and the output means 5.

The processor 31 performs a power distribution conversion process 311, a calculation power distribution calculating process 312, a difference distribution calculating process 313, a correlation checking process 314, and an acceptable/unacceptable judging process 315. The power distribution conversion process 311 is a process for converting the power distribution [a distribution of a point group indicating (spherical power S, cylindrical power C and cylinder axis Ax)] measured by the power distribution measuring device 1 into eight distributions. The calculation power distribution calculating process 312 is a process for calculating a design power distribution. The design power distribution (i.e., the calculation power distribution) means a power distribution in the case where the progressive-addition lens is manufactured as is designed.

The difference distribution calculating process 313 is a process for calculating a difference distribution between the power distribution (the actually measured power distribution) measured by the power distribution measuring device 1 and the design power distribution (the calculated design power distribution). The correlation checking process 314 is a process for checking the correlation between the difference distribution calculated in the difference distribution calculating process 313 and error patterns prepared in advance. The acceptable/unacceptable judging process 315 is a process for judging whether the lens is acceptable or unacceptable based on the correlation obtained in the correlation checking process 314.

The storage 32 has an acceptable/unacceptable reference storing section 321 and an error pattern storing section 322. The acceptable/unacceptable reference storing section 321 has acceptable/unacceptable judging reference data stored therein, the acceptable/unacceptable judging reference data being used in the acceptable/unacceptable judging process 315. Further, the error pattern storing section 322 has the error patterns stored therein, the error patterns being used in the correlation checking process.

The input means 4 is used for inputting data for identifying the lens-to-be-measured into the evaluation computer 3. Examples of the input means 4 include, for example, a barcode reader, a two-dimensional code reader, a keyboard, a means for receiving identification data transmitted from another device, and the like. Further, examples of the data inputted by the input means 4 include identification data (which is to be described later).

The output means 5 displays or outputs a power distribution (a calculated design power distribution) of a design lens, the power distribution (the actually measured power distribution) of the lens-to-be-measured 100 measured by the power distribution measuring device 1, a difference distribution of the lens-to-be-measured 100 with respect to the design lens, an acceptable/unacceptable judging result obtained based on the difference distribution, and the like. Examples of the output means 5 include, for example, a display device, a printer, a means for outputting the results as data to other device(s), and the like.

[Operation of Spectacle Lens Evaluation Device]

The spectacle lens evaluation device will be described below with reference to FIG. 3.

Figure 3:
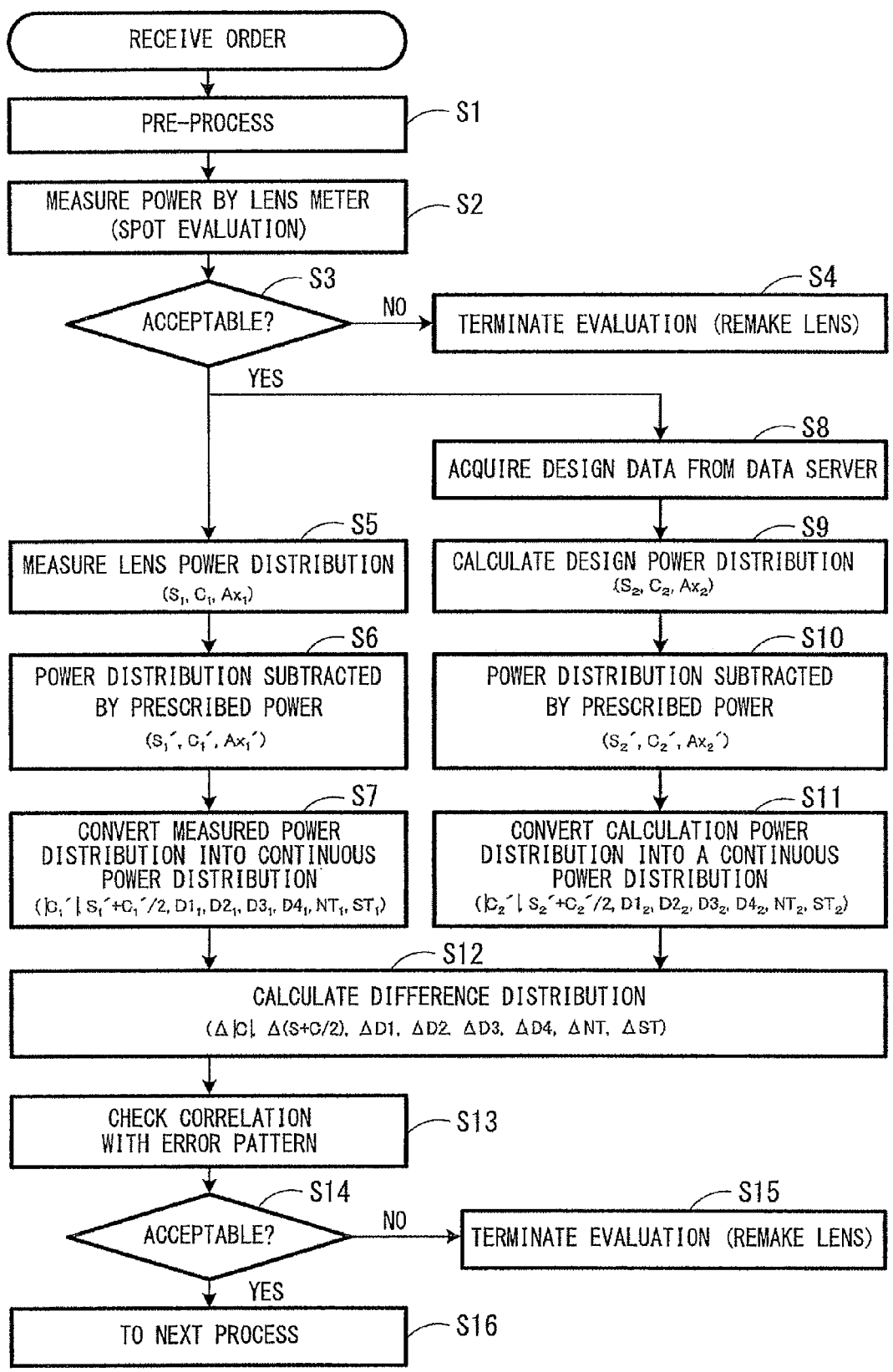
FIG. 3 is a sequence diagram showing the operation of the spectacle lens evaluation device according to the embodiment of the present invention.

FIG. 3 is a sequence diagram showing the operation of the spectacle lens evaluation device according to the present invention.

In the present embodiment, a bi-aspherical type progressive-addition lens having two aspherical surfaces is evaluated. In the bi-aspherical type progressive-addition lens, the function as a progressive-addition lens is achieved by combining the two aspherical surfaces thereof. Incidentally, the lens described below is a right spectacle lens of a pair of spectacles.

1. Pre-Process (Step S1)

First, a pre-process is performed to obtain a plastic lens (a lens-to-be-measured having both surfaces thereof optically finished) (Step S1). Specifically, in the pre-process, an uncut lens (a finished lens before edging) is manufactured based on the order receipt data, the design data and the processing data.

Since prior technologies can be used to manufacture the uncut lens, the manufacturing method of the uncut lens will not be described in detail. For example, the uncut lens having both surfaces thereof optically finished may be formed by cast polymerization molding, injection molding or the like. Further, the uncut lens may also be obtained by processing a lens blank or semi-finished lens blank (which has at least one surface optically unfinished) to optically finish the unfinished surface(s) thereof. In such a case, the optically unfinished surface(s) of the lens blank or semi-finished lens blank is (are) cut by a cutting device such as a curve generator (CG). Thereafter, the cut surface(s) is (are) polished by a polishing device, so that the uncut lens having both surfaces thereof optically finished is formed.

2. First Lens Evaluation Process (Steps S2 to S4)

Next, a first lens evaluation is performed on the uncut lens (the lens-to-be-measured 100) obtained in the pre-process.

The first lens evaluation process is a process for measuring the optical characteristics of the lens-to-be-measured 100 on a spot-by-spot basis and evaluating the measured results. In the first lens evaluation process, the actually measured value and the design value of the dioptric power at specified measurement position(s) (referred to as "first evaluation measurement point(s)" hereinafter) are compared with each other to judge whether the lens is acceptable or unacceptable. In the below description, when simply referred to as "dioptric power" (or "power"), the "dioptric power" (or "power") means optical characteristics characterized by spherical power S, cylindrical power C and cylinder axis Ax.

One or more points may be set as the first evaluation measurement point(s). Although the first evaluation measurement point may be arbitrarily set, it is preferred that first evaluation measurement point includes a position for checking the display value of the dioptric power of the lens.

For example, if the lens is a single-vision lens, a position (the optical center) for measuring the power (back vertex power) of the lens is set as the position for checking the display value of the dioptric power. If the lens is a multi-focal spectacle lens, a position (distance portion reference point) for measuring the distance portion power (back vertex power) and positions for measuring addition power (i.e., a distance portion vertex power measurement point and a near portion reference point) are set as the positions for checking the display value of the dioptric power. If the lens is a progressive-addition lens, a position (a distance portion reference point) for measuring the distance portion power (back vertex power) and positions for measuring the addition power (i.e., a distance portion reference point and a near portion design reference point) are set as the positions for checking the display value of the dioptric power.

In the first lens evaluation process, the dioptric power at the first evaluation measurement point(s) is first measured with the lens meter 6 (refer to FIG. 1) (Step S2). The measurement result is transmitted to the evaluation computer 3. Incidentally, in the case where many points in a wide region are set as the first evaluation measurement points, the dioptric power at respective points may also be measured by using, for example, the device disclosed in Domestic Re-publication of PCT International Publication for Patent Application Publication No. WO 2003/098181 Nov. 27, 2003 with which the dioptric powers at many points can be measured at one time.

Next, the evaluation computer 3 judges whether the measurement result supplied by the lens meter 6 is within an allowable range or not, and thereby judges whether the lens is acceptable or unacceptable (Step S3).

The steps for the evaluation computer 3 to acquire the allowable range will be described below.

First, identification data attached to the lens-to-be-measured 100 is read by the input means (such as a bar-code reader or an IC chip reader) 4, wherein the identification data identifies the lens-to-be-measured 100. The identification data includes information such as information represented by the bar-code printed on a written instruction, information stored in the IC chip, and the like. The input means 4 transmits the read identification data to the evaluation computer 3.

The evaluation computer 3 transmits the identification data read by the input means 4 to the data server 2 via a network to inquire for the design data and the order receipt data of the lens-to-be-measured 100 corresponding to the identification data. Upon receiving the identification data from the evaluation computer 3, the data server 2 extracts the design data and the order receipt data of the lens-to-be-measured 100 corresponding to the identification data from the design data storing section 21 and the order receipt data storing section 22, and transmits the data to the evaluation computer 3. The design data contains information on the display value (the dioptric power and the like) at the first evaluation measurement point(s) of the lens-to-be-measured and the allowable range of the display value. As a result, the evaluation computer 3 can acquire the allowance condition.

When it is judged that the measurement result supplied by the lens meter 6 is out of the allowable range in the process of Step S3, the evaluation computer 3 judges that the result of the first lens evaluation of the lens-to-be-measured 100 is unacceptable, and thereby the lens evaluation is terminated (Step S4). The unacceptable lens-to-be-measured 100 is remade, or reused as resources.

While when it is judged that the measurement result supplied by the lens meter 6 is within the allowable range in the process of Step S3, the evaluation computer 3 judges that the result of the first lens evaluation of the lens-to-be-measured 100 is acceptable, and thereby the processing is passed to the next step (Step S5).

3. Second Lens Evaluation Process (Steps S5 to S15)

Next, a second lens evaluation is performed on the lens-to-be-measured 100 judged acceptable in the first lens evaluation process.

The second lens evaluation process includes a power distribution measuring process for measuring the actually measured power distribution of the lens-to-be-measured 100; a similarity search process in which a comparison power distribution created based on the actually measured power distribution and a previously prepared defective power distribution are compared with each other to perform a similarity search between the comparison power distribution and the defective power distribution; and an evaluation process in which whether or not the comparison power distribution and the defective power distribution are similar to each other is determined based on the result of the similarity search process, and if it is determined that the comparison power distribution and the defective power distribution are similar to each other, then the progressive-addition lens 100 is evaluated as defective.

In the second lens evaluation process, first, the actually measured power distribution of the lens-to-be-measured 100 is measured (Step S5), and the prescribed power is subtracted from the actually measured power distribution. Herein, the prescribed power means the power prescribed according to the visual acuity of the wearer who is to wear the manufactured spectacles (in the present embodiment, the spectacles have the progressive-addition lenses). In the case where the lens to be evaluated is a multi-focal spectacle lens or a progressive-addition lens, the prescribed power to be subtracted is the prescribed power of the distance portion.

Next, the actually measured power distribution with the prescribed power subtracted is converted into a continuous power distribution (Step S7). Further, the evaluation computer 3 calculates the difference distribution (the comparison power distribution) between the continuous power distribution converted from the actually measured power distribution and the continuous power distribution converted from the calculation power distribution with the prescribed power (the design power distribution) subtracted (Step S12).

Next, the correlation between the difference distribution (the comparison power distribution) and the error pattern (the defective power distribution) is checked (Step S13). Thereafter, an acceptable/unacceptable judgment is performed based on the result of the correlation check performed in the process of Step S13 (Step S14). Further, if it is judged that the lens is unacceptable in Step S14, then the lens evaluation is terminated (Step S15); and if it is judged that the lens is acceptable, then the processing is passed to the next step (Step S16).

Details of each step of the second lens evaluation process will be described below.

(1) Power Distribution Measuring Process (Step S5)

In the power distribution measuring process, the dioptric power is measured by the power distribution measuring device 1 for many measurement points (referred to as "second evaluation measurement points" hereinafter) in a wide region, and the dioptric power distribution of the lens-to-be-measured 100 is obtained based on the measurement result. Incidentally, in the present embodiment, the dioptric power distribution (or the power distribution) means a distribution of points characterized by spherical power S, cylindrical power C and cylinder axis Ax. Further, the measuring device for measuring the dioptric power of the second evaluation measurement points can be any device as long as it can measure the dioptric power at many measurement points in a wide region, instead of being limited to the power distribution measuring device 1.

Details of creating the power distribution using the power distribution measuring device 1 will be described below with reference to FIG. 4.

Figure 4:
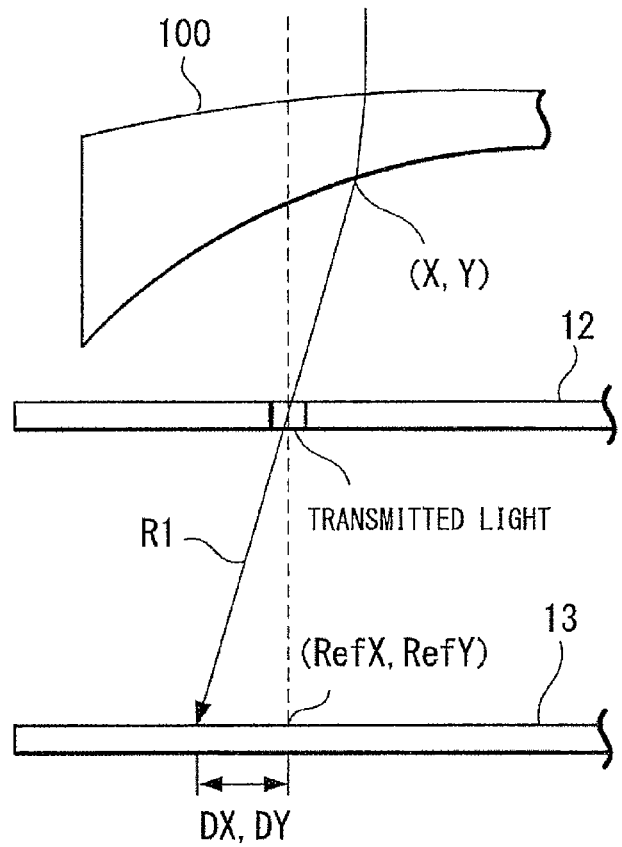
FIG. 4 is a view explaining measured data outputted from the power distribution measuring device according to the embodiment of the present invention.

FIG. 4 is a view explaining measured data outputted from the power distribution measuring device 1.

First, the lens-to-be-measured 100 is set on the power distribution measuring device 1, and the measurement is started. When the measurement is started, a parallel light is emitted from the light source device 11, and the parallel light passes through the lens-to-be-measured 100 to be split into a plurality of light beams by the beam splitter 12. Thus, a plurality of light spots corresponding to the plurality of light transmitting holes of the beam splitter 12 are projected on the screen 13.

The power distribution measuring device 1 obtains reference coordinates RefX, RefY, coordinates X, Y, deviation DX, DY and dioptric power as measured data.

The reference coordinates RefX, RefY indicate positions of the light spots (referred to as "correction spots" hereinafter) on the screen 13 in a state where the lens-to-be-measured 100 is not set. The coordinates X, Y indicate positions (referred to as "measurement points" hereinafter) where the light of the light source device 11 is emitted from the surface of the lens-to-be-measured 100 facing the beam splitter 12.

The deviation DX, DY is a deviation between the positions of the light spots (referred to as "measurement spots" hereinafter) on the screen 13 in a state where the lens-to-be-measured 100 is set and the positions of the correction spots (i.e., the correction spots which have passed through the same light transmitting holes as the measurement spots have) corresponding to the light spots. The dioptric power is calculated based on the light path of the light having passed through the lens-to-be-measured 100.

The reference coordinates RefX, RefY, the coordinates X, Y, the deviation DX, DY and the dioptric power are outputted corresponding to each of the spots. Thus, the dioptric power at coordinates X, Y of each of the measurement points can be obtained, in other words, the dioptric power distribution (i.e., spherical power $S_1$, cylindrical power $C_1$, and cylinder axis $Ax_1$) of the lens-to-be-measured 100 can be obtained. The obtained dioptric power distribution of the lens-to-be-measured 100 is transmitted to the evaluation computer 3 as the actually measured power distribution.

(2) Process for Creating Power Distribution by Subtracting Prescribed Power from Actually Measured Power Distribution In the entire region, the evaluation computer 3 subtracts the prescribed power from the actually measured power distribution ($S_1$, $C_1$, $Ax_1$) of the lens-to-be-measured 100 received from the power distribution measuring device 1 to create a reference actually measured power distribution ($S_1'$, $C_1'$, $Ax_1'$).

The reason why the prescribed power (the distance portion prescribed power) should be subtracted from the dioptric power distribution to form the reference actually measured power distribution is described as follows. The dioptric power corresponding to the prescribed power is dioptric power necessary to be formed in a wide region of the lens. Thus, the evaluation can be performed more properly if the evaluation is performed only on the remaining dioptric power from which the prescribed power has been subtracted. Incidentally, "the prescribed power is subtracted from the power distribution" means that the power distribution is corrected so that the distance power (S, C, Ax) prescribed in the entire region of the lens is eliminated.

(3) Process for Converting Actually Measured Power Distribution into Continuous Power Distribution (Step S7).

A process for creating the average power distribution, the astigmatism distribution and the continuous actually measured power distribution based on the reference actually measured power distribution obtained in Step S6 will be described below with reference to FIGS. 5 and 6.

Figure 5:
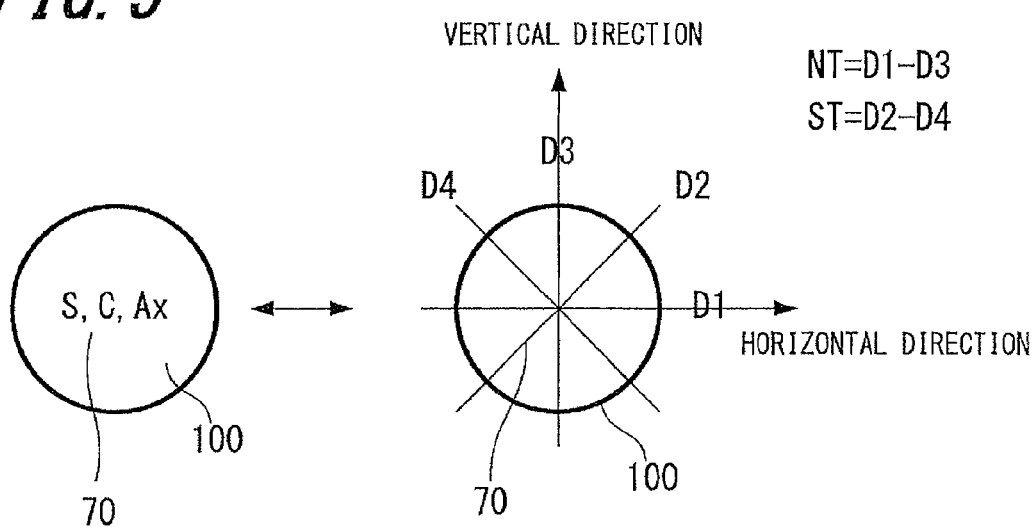
FIG. 5 is a view explaining a process for converting a power distribution (S, C, Ax) into power distributions (D1, D2, D3, D4, NT, ST) in an example.

FIG. 5 is a view explaining the processing for converting a reference actually measured power distribution ($S_1'$, $C_1'$, $Ax_1'$) into power distributions (D1, D2, D3, D4, NT, ST). FIG. 6 is a view showing the average power distribution, the astigmatism distribution and the power distributions (D1, D2, D3, D4, NT, ST) obtained based on the reference actually measured power distribution ($S_1'$, $C_1'$, $Ax_1'$).

As shown in FIG. 5, the reference actually measured power distribution ($S_1'$, $C_1'$, $Ax_1'$) is formed by a point group obtained by characterizing the second evaluation measurement points 70 with spherical power S, cylindrical power C and cylinder axis Ax. The average power distribution and the astigmatism distribution are created based on the reference actually measured power distribution.

The average power distribution is a distribution of a value calculated by summing spherical power S and half of cylindrical power C of each the second evaluation measurement points 70, i.e., the average power distribution is a distribution of the value ($S_1'+C_1'/2$). Further, the astigmatism distribution is a distribution of the absolute value of cylindrical power C of each of the second evaluation measurement points 70, i.e., the astigmatism distribution is a distribution of $|C_1'|$.

Figure 6:
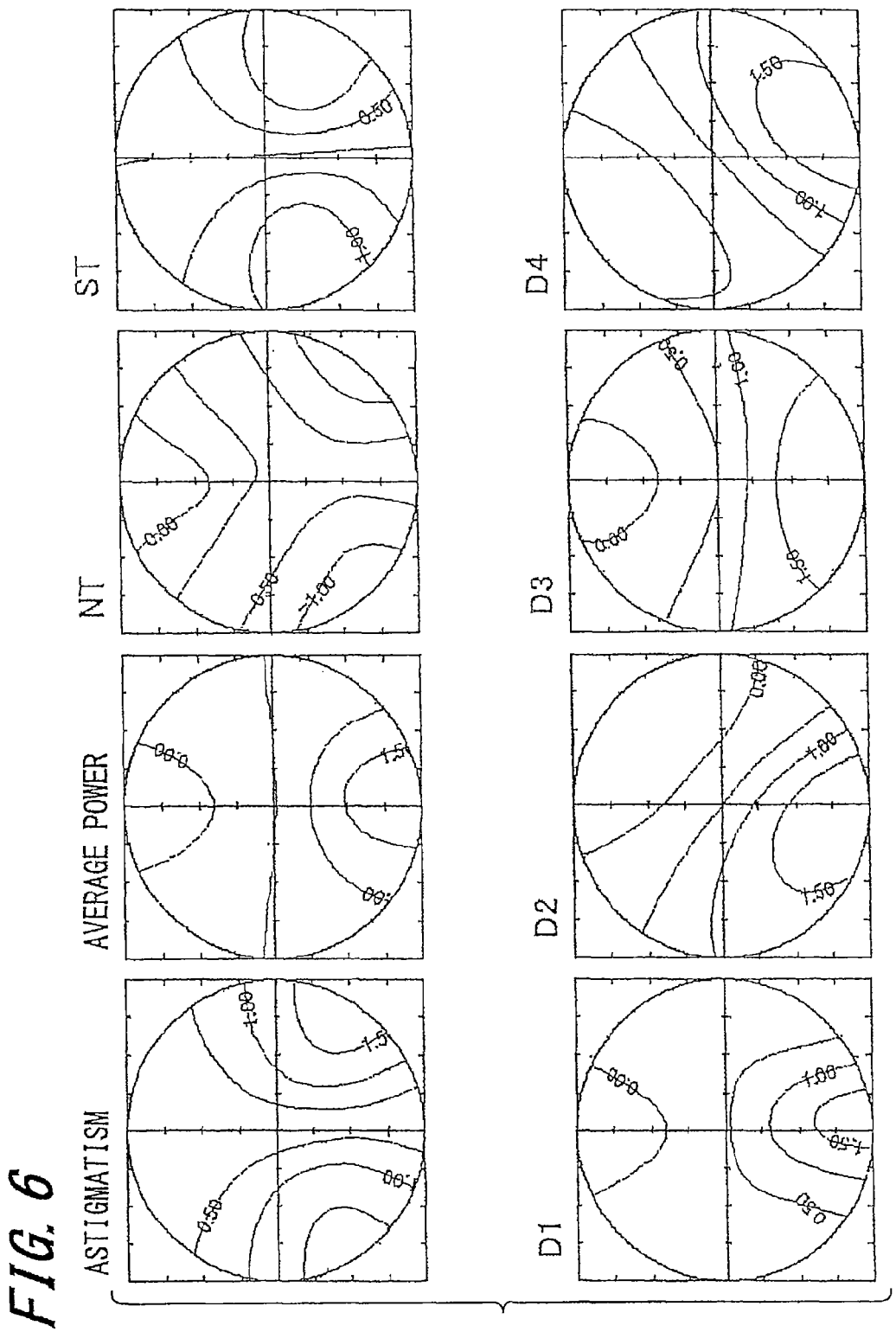
FIG. 6 is a view showing an average power distribution and an astigmatism distribution contained from the power distribution (S, C, Ax), and a result of converting the power distribution (S, C, Ax) into power distributions (D1, D2, D3, D4, NT, ST) in an example.

Owing to the existence of discontinuous region, the astigmatism distribution can not be differentiated (incidentally, the discontinuous region is apt to exist on lines parallel to the vertical axis shown in FIG. 6).

Since the average power distribution is a distribution of a value (power) obtained by averaging the powers of each of the second evaluation measurement points 70 in all directions and therefore contains much information, the average power distribution can not be used to perform high-precision power distribution evaluation. Further, since information on cylinder axis Ax of each of the second evaluation measurement points 70 is not contained in the astigmatism distribution and the average power distribution, the astigmatism distribution and the average power distribution can not be used to perform high-precision power distribution evaluation. To solve these problems, in addition to the astigmatism distribution and the average power distribution, a dioptric power distribution having continuity and reflecting information on cylinder axis Ax is created in Step S7.

Such a dioptric power distribution can be created by converting the reference actually measured power distribution into a power distribution which indicates a power of each of the second evaluation measurement points 70 in an arbitrary direction. Since the direction of the power of each of the second evaluation measurement points 70 is unified, the dioptric power distribution created in such a manner has continuity and reflects information on cylinder axis Ax. Incidentally, although the aforesaid arbitrary direction can be suitably set, it is preferred that a plurality of equiangularly-spaced directions are set as the arbitrary direction. This is because, by converting the reference actually measured power distribution based on the plurality of equiangularly-spaced directions, the power at each of the second evaluation measurement points 70 can be grasped in more detail.

Further, as shown in FIG. 5, assuming that the horizontal direction is 0-degree and the counterclockwise direction is the positive direction, it is preferred that four directions of 0-degree (direction D1), 45-degree (direction D2), 90-degree (direction D3), 135-degree (direction D4) are set as the arbitrary direction. In such a manner, by setting the four directions of D1 to D4 as the arbitrary direction, the lens-to-be-measured can be suitably evaluated by power distributions in few directions (four directions). In other words, not only the power distributions in both the vertical direction and the horizontal direction (which are important directions in evaluating the spectacle lens) are included, and also the power distributions in the directions between the vertical direction and the horizontal direction are included. Further, if the power distributions of D1 to D4 are obtained, the power at any point and in any direction on the lens can be calculated. Incidentally, the arbitrary direction is not limited to the aforesaid four directions, but includes a plurality of directions perpendicular to each other.

In the following description, the power (dioptric power) of each of the second evaluation measurement points 70 in direction D1 is referred to as "D1", and the distribution of D1 is referred to as "distribution D1". Further, the power of each of the second evaluation measurement points 70 in direction D2 is referred to as "D2", and the distribution of D2 is referred to as "distribution D2". Further, the power of each of the second evaluation measurement points 70 in direction D3 is referred to as "D3", and the distribution of D3 is referred to as "distribution D3". Further, the power of each of the second evaluation measurement points 70 in direction D4 is referred to as "D4", and the distribution of D4 is referred to as "distribution D4".

The astigmatism distribution is a distribution having a focus at cylindrical power C. As described above, the astigmatism distribution has no continuity and contains no information on cylinder axis Ax. As a distribution close to the astigmatism distribution, a distribution indicating the difference between the powers (dioptric power) in two directions perpendicular to each other is used in the present embodiment. Such a distribution is close to the astigmatism distribution, and at the same time has continuity and contains information on cylinder axis Ax.

In the case where the directions of D1 to D4 are set as the arbitrary direction, the number of the distribution indicating the difference between the powers (the dioptric power) in two directions perpendicular to each other is two. In the two distributions, one distribution (referred to as "distribution NT" hereinafter) indicates the difference (NT=D1−D3) between the power distribution in direction D1 (0-degree) and the power distribution in direction D3 (90-degree). The other distribution (referred to as "distribution ST" hereinafter) indicates the difference (ST=D2−D4) between the power distribution in direction D2 (45-degree) and the power distribution in direction D4 (135-degree).

At each of the second evaluation measurement points 70, the set ($S_1'$, $C_1'$, $Ax_1'$) corresponds to the set (D1, D2, D3, D4), and NT and ST can be calculated by using predetermined calculating formulas. In other words, the set ($S_1'$, $C_1'$, $Ax_1'$) corresponds to the set (D1, D2, D3, D4, NT, ST). Further, by using the six distributions D1, D2, D3, D4, NT, ST, which reflect information on cylinder axis Ax, the optical characteristics (power distribution) of the lens-to-be-measured 100 can be effectively evaluated.

(4) Process for Creating Design Power Distribution (Steps S8, S9)

In addition to the process of Steps S5 to S7, a design dioptric power distribution (calculation power distribution) of the lens-to-be-measured 100 is created for the lens-to-be-measured 100 judged acceptable in the process of the first lens evaluation process (i.e., Step S3).

If the result of the first lens evaluation performed on the lens-to-be-measured 100 in Step 3 is acceptable, then the processor 31 of the evaluation computer 3 acquires the design data and the order receipt data of the lens-to-be-measured 100 from the data server 2 (Step S8).

Next, based on the design data and the order receipt data of the lens-to-be-measured 100, the processor 31 of the evaluation computer 3 creates a three-dimensional shaped model of the lens. Further, based on the created three-dimensional shaped model and the refractive index of the lens, the processor 31 of the evaluation computer 3 calculates the dioptric power of each of points (referred to as "calculation power calculating points" hereinafter) in a wide region, and calculates the power distribution ($S_2$, $C_2$, $Ax_2$) of the dioptric power (Step S9). Incidentally, it is preferred that positions corresponding to the second evaluation measurement points 70 are set as the calculation power calculating points.

(5) Process for Creating Power Distribution by Subtracting Prescribed Power from Calculation Power Distribution (Step S10)

Over the entire region, the processor 31 of the evaluation computer 3 subtracts the prescribed power from the calculation power distribution ($S_2$, $C_2$, $Ax_2$) obtained in the process of Step 9 to create a reference calculation power distribution ($S_2'$, $C_2'$, $Ax_2'$) (Step S10).

(6) Process for Converting Calculation Power Distribution into Continuous Power Distribution (Step S11).

Based on the reference calculation power distribution ($S_2'$, $C_2'$, $Ax_2'$) obtained in the process of Step 10, the processor 31 of the evaluation computer 3 creates a design average power distribution, a design astigmatism distribution and a continuous calculation power distribution (Step S11).

The continuous calculation power distribution is created in the same manner as that for creating the aforesaid continuous actually measured power distribution. In other words, powers ($D1_2$, $D2_2$, $D3_2$, $D4_2$) of each of the calculation power calculating points in direction D1, direction D2, direction D3 and direction D4 are calculated, and a distribution D1, a distribution D2, a distribution D3 and a distribution D4 in design are created. Further, $NT_2$, $ST_2$ are calculated based on $D1_2$, $D2_2$, $D3_2$, and $D4_2$, and a distribution NT and a distribution ST are created. The distribution D1, distribution D2, distribution D3, distribution D4, distribution NT and distribution ST in design have continuity and reflect cylinder axis Ax.

(7) Process for Creating Difference Distribution (Step S12)

Based on the actually measured average power distribution, astigmatism distribution, distributions D1 to D4, distribution NT and distribution ST obtained in the process of Step S7 and the calculated average power distribution, astigmatism distribution, distributions D1 to D4, distribution NT and distribution ST obtained in the process of Step S11, the processor 31 of the evaluation computer 3 creates respective difference distributions (i.e., comparison power distributions). Specifically, the processor 31 of the evaluation computer 3 calculates the difference between each power of the second evaluation measurement points 70 and each power of the calculation power calculating points corresponding to the second evaluation measurement points 70 to create the respective difference distributions.

Difference $\Delta|C|$ of the average power distribution is calculated by the following equation:

$$\Delta|C|=|C_1'|-|C_2'|$$

Difference Δ(S+C/2) of the average power distribution is calculated by the following equation:

$$\Delta(S+C/2)=(S_1'+C_1'/2)-(S_2'+C_2'/2)$$

Difference ΔD1 of distribution D1 is calculated by the following equation:

$$\Delta D1=D1_1-D1_2$$

Difference ΔD2 of distribution D2 is calculated by the following equation:

$$\Delta D2=D2_1-D2_2$$

Difference ΔD3 of distribution D3 is calculated by the following equation:

$$\Delta D3=D3_1-D3_2$$

Difference ΔD4 of distribution D4 is calculated by the following equation:

$$\Delta D4=D4_1-D4_2$$

Difference ΔNT of distribution NT is calculated by the following equation:

$$\Delta NT=NT_1-NT_2$$

Difference ΔST of distribution ST is calculated by the following equation:

$$\Delta ST=ST_1-ST_2$$

Figure 7:
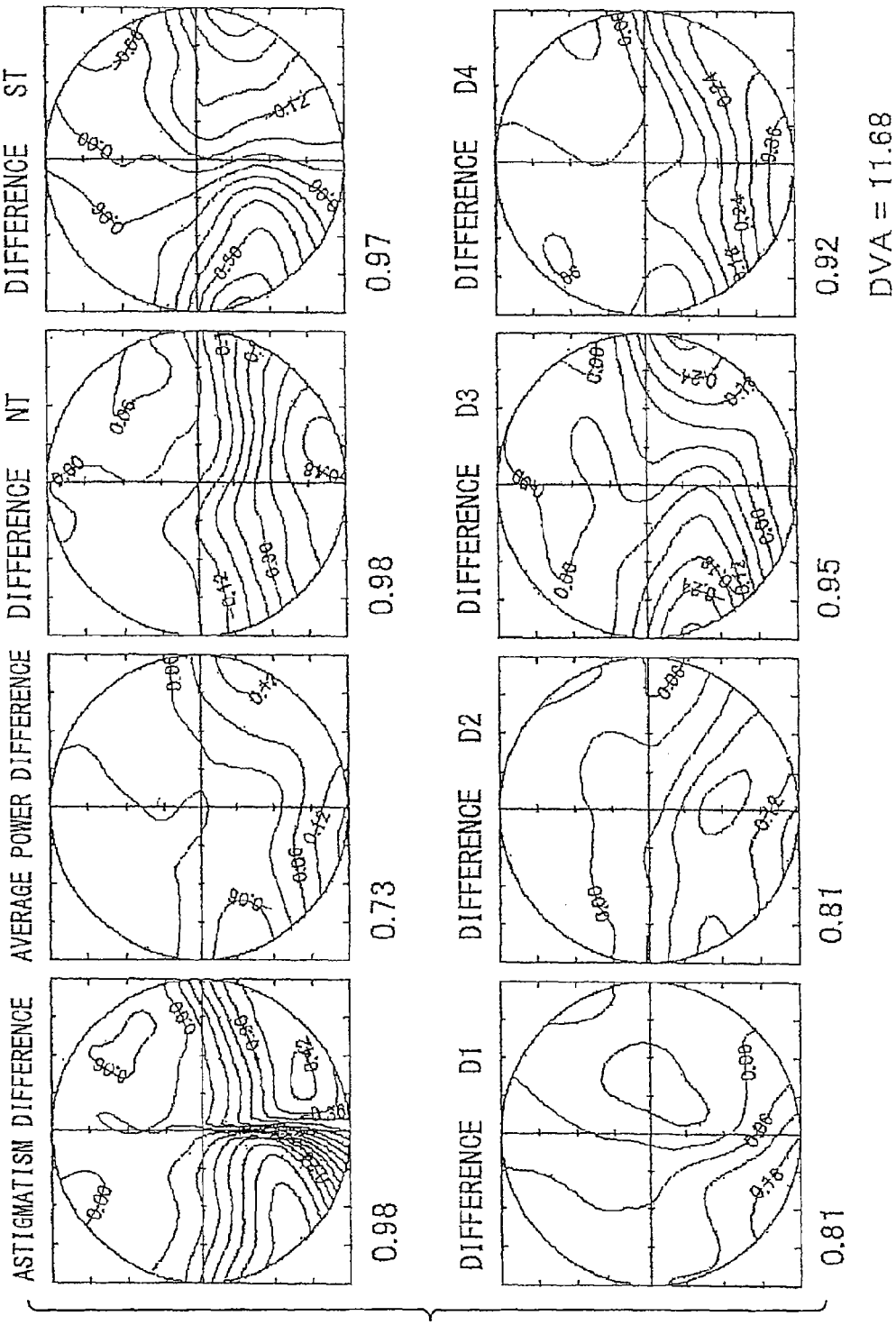
FIG. 7 is a view showing difference distributions created based on an actually measured power distribution of a progressive-addition lens in which a relative positional shift is caused between a front surface and a back surface.
Figure 8:
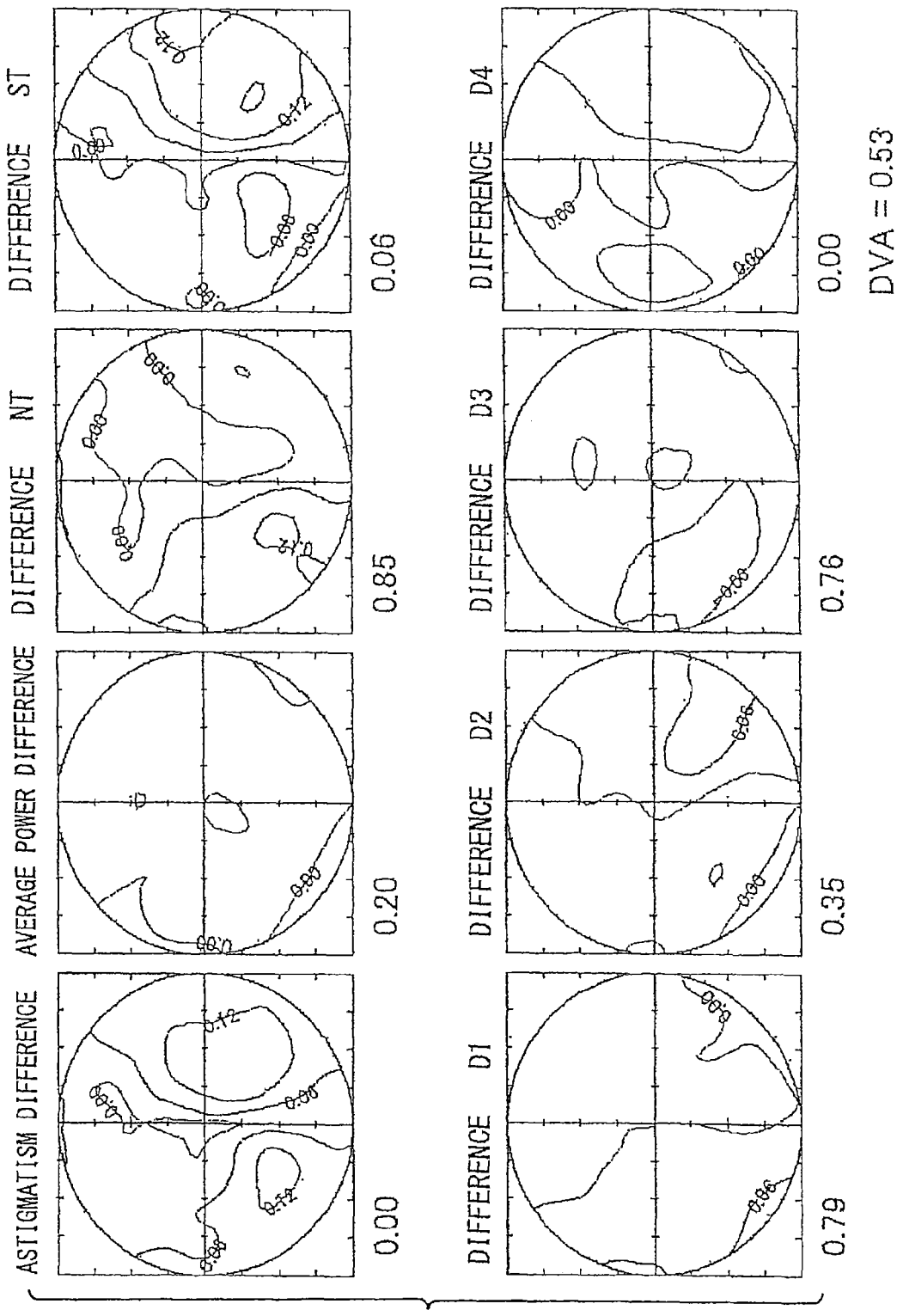
FIG. 8 is a view showing difference distributions created based on an actually measured power distribution of a progressive-addition lens in which no relative positional shift is caused between a front surface and a back surface.

FIGS. 7 and 8 show an example of the eight difference distributions obtained in the difference distribution creating process. FIG. 7 is a view showing the difference distributions created based on the actually measured power distribution of a lens-to-be-measured 100 where a relative positional shift is caused between the front surface and the back surface. FIG. 8 is a view showing the difference distributions created based on the actually measured power distribution of a lens-to-be-measured 100 where no relative positional shift is caused between the front surface and the back surface (i.e., a normal lens-to-be-measured 100).

(8) Process for Checking Correlation Between Difference Distribution and Error Pattern (Step S13).

First, the error pattern (i.e., the defective power distribution) used in the correlation checking process (the similarity search process) will be described below with reference to FIGS. 9 to 13.

The defective power distribution is a power distribution corresponding to a state where a relative shift is generated between the front surface (the surface far from the eye of the wearer; usually is a convex surface) and the back surface (the surface near from the eye of the wearer; usually is a concave surface) of the lens-to-be-measured 100.

First, the relative shift generated between the front surface and the back surface of the lens-to-be-measured 100 is described below with reference to FIGS. 9A-9G. FIGS. 9A-9G explain examples in which the relative shift is generated between the front surface and the back surface of the lens-to-be-measured 100.

Figure 9A:
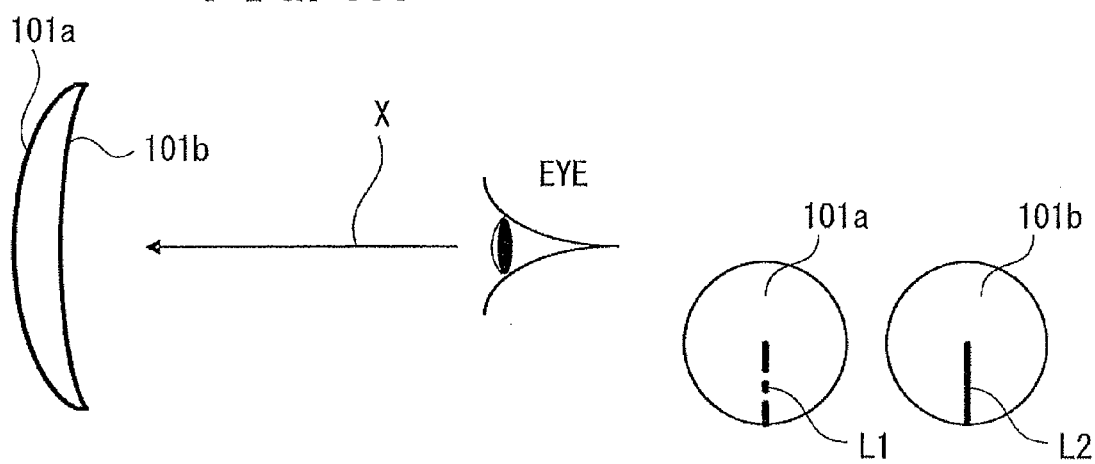
FIGS. 9A to 9G explain examples in which a relative shift is generated between the front surface and the back surface of a progressive-addition lens.
Figure 9B:
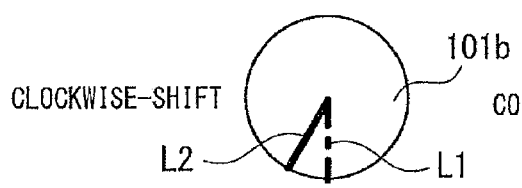
Figure 9C:
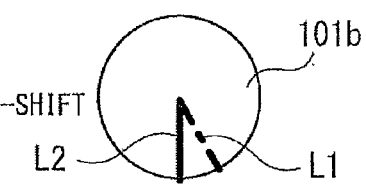
Figure 9D:
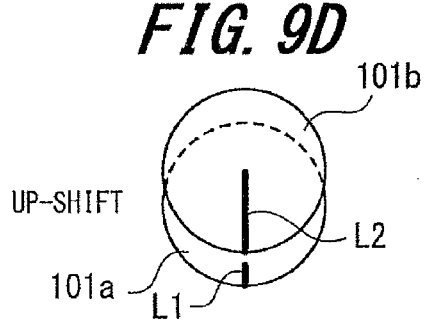

As shown in FIG. 9A, the relative shift generated between a front surface 101a and a back surface 101b of the lens-to-be-measured 100 represents a shift of the back surface 101b relative to the front surface 101a when viewed from the side of the back surface 101b of the lens-to-be-measured 100 (i.e., when viewed from the X-direction shown in FIG. 9A). In other words, if a virtual line L1 of the front surface 101a and a virtual line L2 of the back surface 101b are aligned with each other, then no shift is generated between the front surface 101a and the back surface 101b.

The relative shift between the front surface 101a and the back surface 101b mainly includes shift in the rotational direction, shift in the up-down direction, and shift in the left-right direction. The shift in the rotational direction includes a clockwise-shift state in which the back surface 101b is clockwise-shifted relative to the front surface 101a (see FIG. 9B), and a counterclockwise-shift state in which the back surface 101b is counterclockwise-shifted relative to the front surface 101a (see FIG. 9c).

Figure 9E:
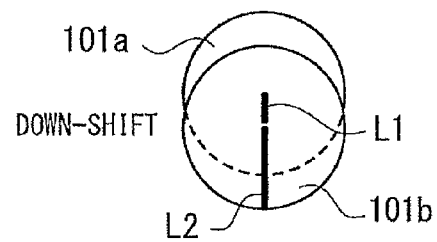
Figure 9F:
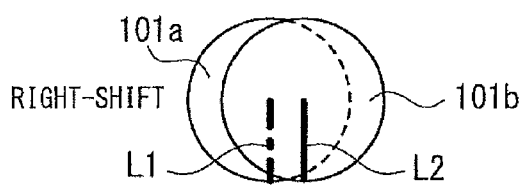
Figure 9G:
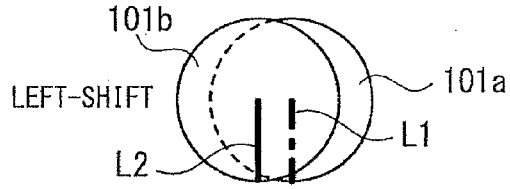

The shift in the up-down direction includes an up-shift state in which the back surface 101b is up-shifted relative to the front surface 101a (see FIG. 9D), and a down-shift state in which the back surface 101b is down-shifted relative to the front surface 101a (see FIG. 9E). The shift in the left-right direction includes a right-shift state in which the back surface 101b is right-shifted relative to the front surface 101a (see FIG. 9F), and a left-shift state in which the back surface 101b is left-shifted relative to the front surface 101a (see FIG. 9G).

Incidentally, the relative shift also includes a shift state formed by combining the aforesaid shift states.

Next, the defective power distribution (the error pattern) will be described below.

In order to obtain the defective power distribution, first, conditions (which include prescribed power, design pattern, center thickness, refractive index, prism and the like) are set, and a lens having no shift generated between the front surface and the back surface thereof is designed as a lens for error pattern according to the aforesaid conditions. Further, a calculation power distribution in design of the lens is created.

On the other hands, lenses having the aforesaid every shift states generated between the front surface and the back surface thereof are respectively designed according to the same conditions, and the calculation power distributions in design of the lenses are created.

Next, the prescribed power of the lens for error pattern is subtracted respectively from each of the calculation power distributions corresponding to the respective shift states and from the calculation power distribution corresponding to the state where on shift is generated. Incidentally, when the prescribed power of the lens for error pattern is set to, for example, a spherical power of 0.00 D, an addition power of 2.00 D, since the distance portion from which the prescribed power is to be subtracted is 0.00 D, the subtraction operation may be omitted.

Further, the defective power distribution is created by calculating the difference distribution between each of the calculation power distributions corresponding to the respective shift states with the prescribed power subtracted and the calculation power distribution corresponding to the state where no shift is generated with the prescribed power subtracted. In other words, the defective power distribution equals to the difference distribution between each of the calculation power distributions corresponding to the respective shift states and the calculation power distribution corresponding to the state where no shift is generated. Eight of such defective power distributions are created in advance, which are: astigmatism difference distribution, average power difference distribution, difference distribution D1, difference distribution D2, difference distribution D3, difference distribution D4, difference distribution NT, and difference distribution ST.

The defective power distribution has particular pattern according to different defective factors. The defective factors include, for example, the aforesaid rotational shift between the front surface and the back surface of the lens, and the aforesaid positional shift represented by the vertical shift and the lateral shift. The positional shift is caused by position shift of a lens holder attached when processing the optical surface of the lens, position shift of a mark formed on the lens for positioning the lens holder, position shift of the lens holder during cutting/polishing process.

However, the spectacle lens is processed according to the prescribed power prescribed for the wearer, i.e., spherical power S, cylindrical power C and cylinder axis Ax. Thus, there are a plurality of combinations of the spherical power S, the cylindrical power C and the cylinder axis Ax of the prescribed power, and further, considering the number of types of the lens designs, the number of combinations may be infinite. In order to evaluate the optical characteristics of the lens more precisely, it will be better to create the error patterns for each of the prescribed powers and each of the design types ordered by the customer, and check the correlation between the error patterns and the difference distribution obtained based on the actually measured power distribution.

However, since it takes time to create an error pattern, it will be inefficient to create the error patterns one by one for all possible combined defects (the shift states between the front surface and the back surface) of each of the measured lens to perform evaluation. Particularly, it will take time to create the error pattern particularly in the case where there are a plurality of error patterns.

It has been known from the result of various researches that, in a progressive-addition lens whose progressive-power is achieved by combining the both surface as described in Japanese Patent Registration No. 3617004, the characteristic difference distribution (i.e., the error pattern) observed in the case where a relative shift is caused between the front surface and the back surface does not largely depend on the prescribed power and the design type. In other words, the observed difference distributions (i.e., the error patterns) of different lenses will have substantially the same characteristics if the types of the relative shift between the front surface and the back surface of the lenses are the same. Thus, it is only necessary to previously prepare the error patterns for all possible combined defects (the shift states between the front surface and the back surface) for a representative prescribed power and design type, instead of for all prescribed powers and design types.

Further, since the progressive-addition lens has addition power, the difference of the addition power will be a factor that influences the error pattern. However, the influence of the difference of the addition power will be exerted only on variance of each of the eight distributions (set) of the error pattern (i.e., variation of each of the eight distributions). On the other hands, no influence of the variance will be exerted on the correlation. For example, as can be known from an equation (which is to be described later) regarding a correlation coefficient, since the correlation coefficient is obtained by dividing the covariance of two sets by the standard deviations (=the root of variance) of the respective sets, no influence of the variance will be exerted on the correlation. Thus, it is only necessary to prepare the error pattern for one representative addition power, instead of individually preparing the error pattern for all possible addition powers.

Further, the degree (amount) of the positional shift and rotational shift between the front surface and the back surface is a factor that influences the error pattern. However, it has been known from the result of various researches that, if the degree of the shift falls within a certain range, the influence of the difference of the positional shift and rotational shift will be exerted only on the variance of each of the eight distributions of the error pattern. The aforesaid "certain range" can be generally considered as: about ±5 mm in both vertical and lateral directions in the case of a positional shift; and about 10-degrees in both clockwise and counterclockwise directions in the case of a rotational shift. Thus, when preparing the error pattern for the positional shift and the rotational shift, the error pattern may prepared for one representative value within the aforesaid range only, instead of for all possible shift amounts.

Considering the aforesaid characteristics, when creating the error pattern for a combined defect, it is only necessary to consider a representative power, a representative design type and a representative shift amount, instead of considering all possible conditions. By previously calculating the possible error patterns in the aforesaid manner, since it is not necessary to calculate the error patterns one by one when performing evaluation, the time for performing evaluation can be significantly reduced.

FIGS. 10 to 14 show the error patterns (i.e., the difference distributions) in the respective shift states between the front surface 101a and the back surface 101b of the lens-to-be-measured 100.

Figure 10:
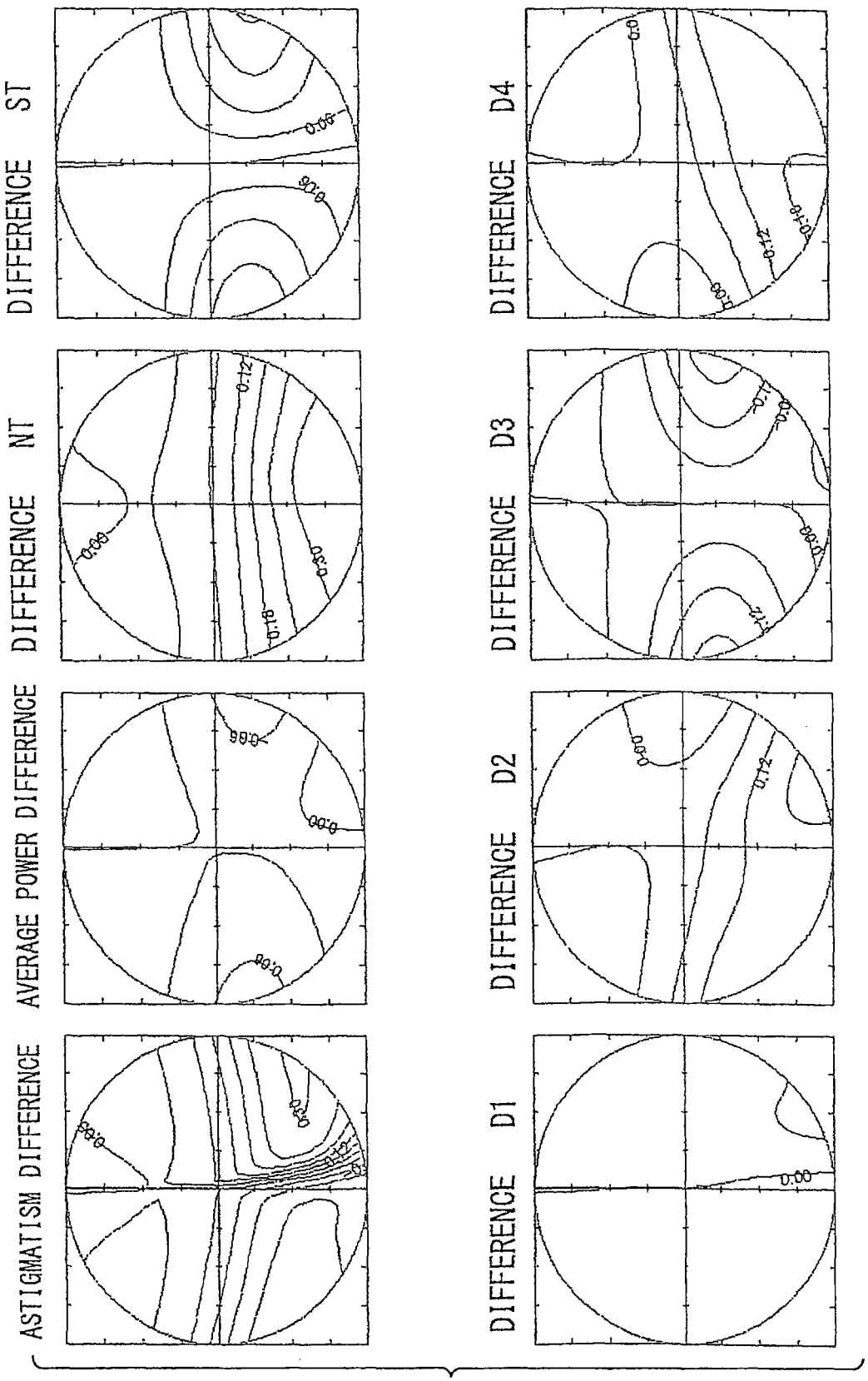
FIG. 10 is a view showing error patterns of the difference distributions of a progressive-addition lens in a state where the front surface of the lens is counterclockwise-shifted relative to the back surface.
Figure 11:
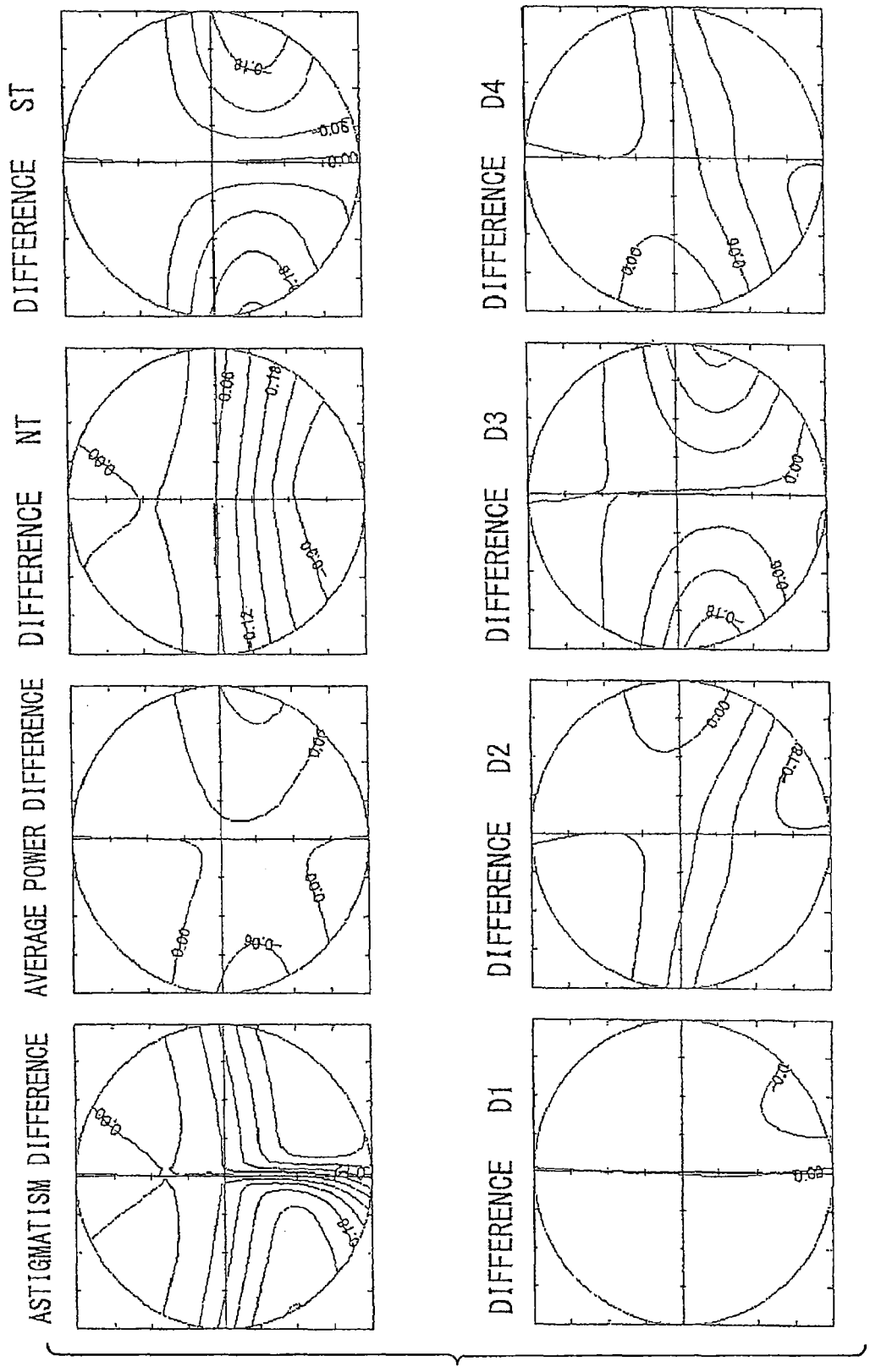
FIG. 11 is a view showing error patterns of the difference distributions of a progressive-addition lens in a state where the front surface of the lens is clockwise-shifted relative to the back surface.
Figure 12:
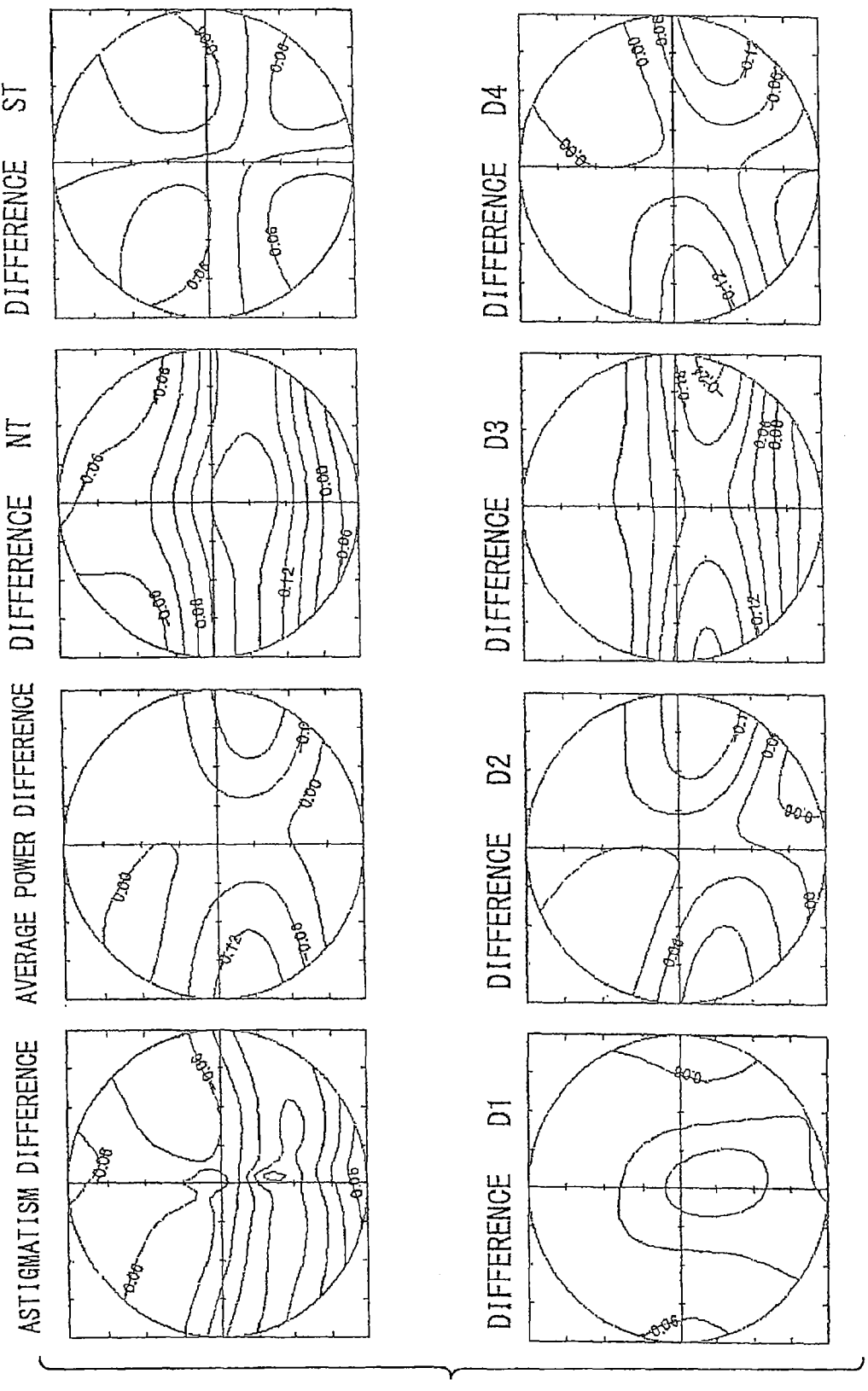
FIG. 12 is a view showing error patterns of the difference distributions of a progressive-addition lens in a state where the front surface of the lens is up-shifted relative to the back surface.
Figure 13:
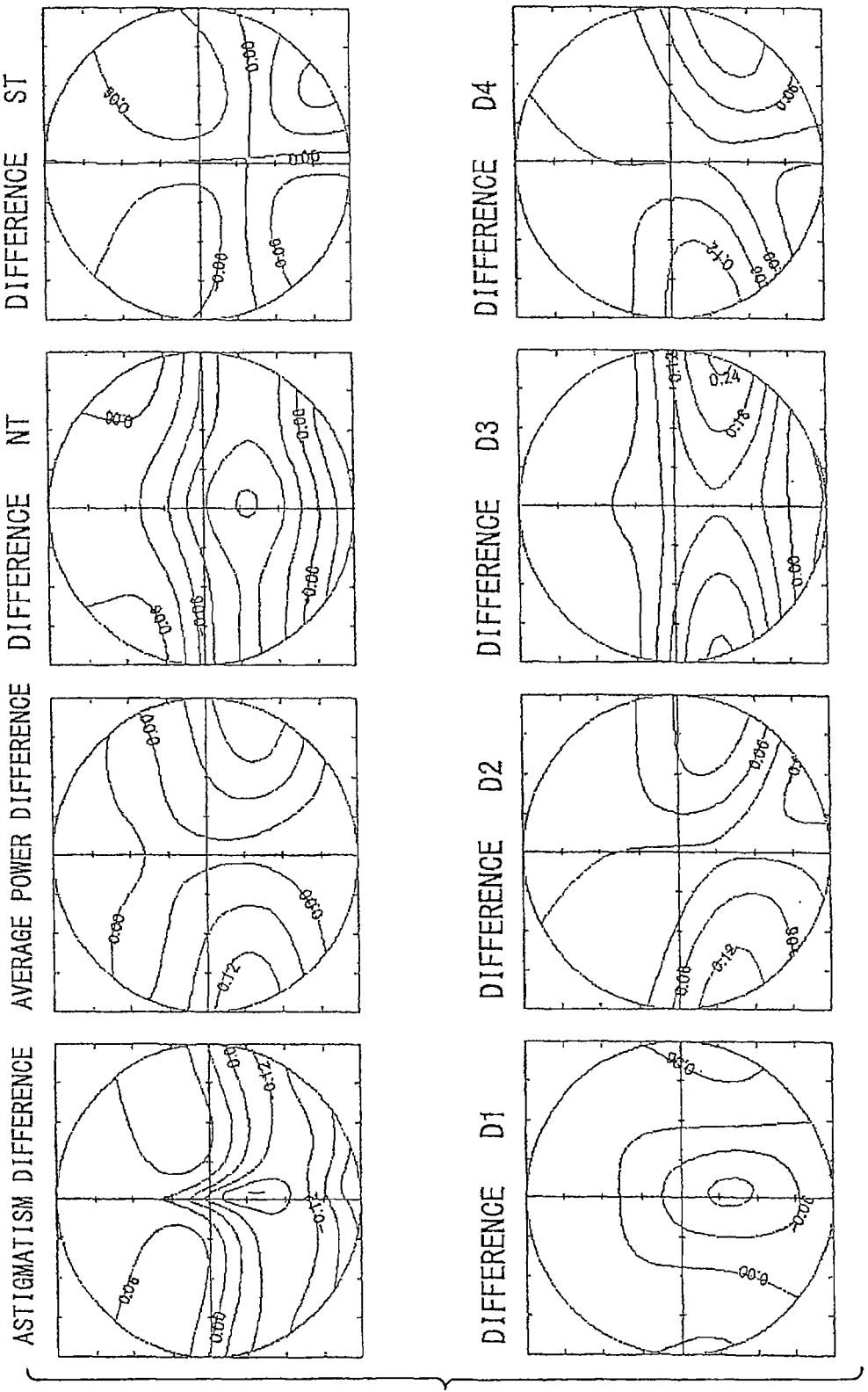
FIG. 13 is a view showing error patterns of the difference distributions of a progressive-addition lens in a state where the front surface of the lens is down-shifted relative to the back surface.
Figure 14:
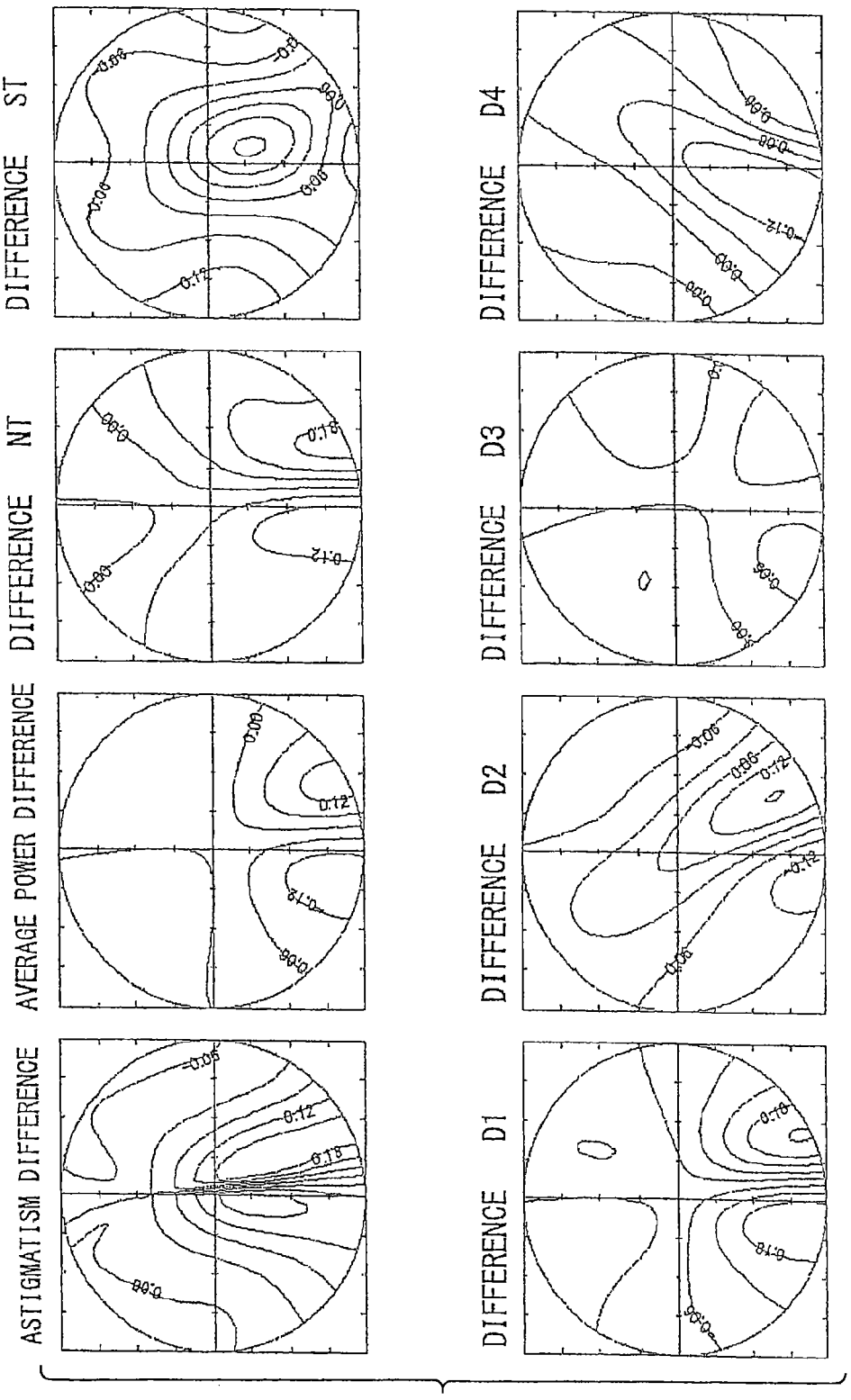
FIG. 14 is a view showing error patterns of the difference distributions of a progressive-addition lens in a state where the front surface of the lens is left-shifted relative to the back surface.

FIG. 10 is a view showing the error patterns obtained in a clockwise-shift state, and FIG. 11 is a view showing the error patterns obtained in a counterclockwise-shift state. FIG. 12 is a view showing the error patterns obtained in an up-shift state, and FIG. 13 is a view showing the error patterns obtained in a down-shift state. FIG. 14 is a view showing the error patterns obtained in a left-shift state.

The error patterns shown in FIGS. 10 to 14 are obtained based on an example in which the prescribed power is: spherical power S: 0.00, and addition power ADD: 2.00. The error patterns shown in FIG. 10 obtained in a clockwise-shift state and the error patterns shown in FIG. 11 obtained in a counterclockwise-shift state are both based on an example in which the back surface 101b is rotated relative to the front surface 101a by 3-degrees. Further, the error patterns shown in FIGS. 12 to 14 are obtained based on an example in which the back surface 101b is shifted relative to the front surface 101a by 2 mm.

As can be known from FIGS. 10 and 11 that, when a rotational shift is generated between the front surface 101a and the back surface 101b, the astigmatism difference distribution most clearly shows the characteristic of the distribution. This is because the astigmatism difference distribution has larger difference than other difference distributions such as the average power difference distribution and the like, and is less susceptible to the influence of the difference caused by factors other than the rotational shift. Thus, in the case of error patterns where rotational shift is generated, it is preferred that the astigmatism difference distribution is largely weighted. Incidentally, the weighting process will be described later.

On the other hand, difference distribution D1 shown in FIGS. 10 and 11 has smaller difference than other difference distributions such as the astigmatism difference distribution and the like, and is susceptible to the influence of the difference caused by factors other than the rotational shift. Thus, in the case of error patterns where rotational shift is generated, it is preferred that difference distribution D1 is less weighted.

When performing the correlation check (similarity judgment) on the rotational shift, although the error pattern of the average power difference distribution, for example, may be used to perform the similarity judgment if a clear error pattern can be obtained, it is preferred that the error pattern of the astigmatism difference distribution is used to perform the similarity judgment. This is because the astigmatism difference distribution has a characteristic error pattern in the case of a rotational shift, and therefore similarity judgment can be performed with higher accuracy.

Further, it is preferred that the error pattern of a difference distribution based on an arbitrary direction is used to perform the similarity judgment. This is because by using the error pattern of a difference distribution based on an arbitrary direction, it is possible to perform the evaluation taking into consideration of cylinder axis Ax, and therefore similarity judgment can be performed with higher accuracy.

Further, it is preferred that the error pattern of a difference distribution based on an arbitrary direction to be used is the error pattern of any one of the six difference distributions: difference distribution D1, difference distribution D2, difference distribution D3, difference distribution D4, difference distribution NT, and difference distribution ST. Incidentally, the similarity judgment may either be performed using the error pattern of any one of the six difference distributions, or be performed using the error patterns of more than one of the six difference distributions.

The correlation check is a process for determining the degree of the similarity between the difference distribution created based on the actually measured power distribution (i.e., the comparison power distribution) and the error patterns (i.e., the defective power distributions). By determining the degree of the similarity, it is possible to determine whether or not the actually measured lens-to-be-measured 100 has the defect characterized by the error patterns (i.e., to determine whether or not the actually measured lens-to-be-measured 100 is in the respective shift states).

There are several methods for determining the degree of the similarity, and representative examples include a method using a correlation coefficient. The correlation coefficient can be calculated using the following Equation:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$ [Equation 1]

where:
r: Correlation coefficient
x: Value of difference distribution (i.e., comparison power distribution)
Y: Value of error pattern
I: Measurement point (i.e., second evaluation measurement points 70)

In the present embodiment, a correlation coefficient is calculated for each of the eight difference distributions, which are: astigmatism difference distribution, average power difference distribution, difference distribution D1, difference distribution D2, difference distribution D3, difference distribution D4, difference distribution NT, and difference distribution ST.

Further, the defective judgment can be performed based on the correlation coefficient between the power of the actually measured power distribution and the power of the error pattern. By using the aforesaid correlation coefficient, it is possible to objectively judge the similarity between the both sides with high accuracy.

In the case of a progressive-addition lens, the places where the power changes concentrically exist in a region extending from the center to the near portion region, instead of the distance portion region, and therefore when a relative positional shift and/or a relative rotational are/is generated between the front surface and the back surface, the characteristic difference is mainly observed in the near portion region.

Thus, in the present embodiment, the center of a line connecting two horizontal alignment reference marks (two hidden marks, for example) on the progressive-addition lens is called a design center, and the correlation coefficient may be calculated only for a region below a horizontal line passing through the design center. In other words, the region below the horizontal line passing through the design center is a region including the near portion region. Further, the region where the correlation coefficient is calculated may also be arbitrarily set.

The horizontal alignment reference marks (i.e., the two hidden marks) are identification marks formed on the lens in an inconspicuous manner. The type, the addition power and the like of the lens can be identified by the hidden marks. A horizontal prism measuring reference point and the like of the lens can be identified base on the position of the hidden marks.

(9) Acceptable/Unacceptable Judging Process (Steps S14 to S15)

In the acceptable/unacceptable judging process (i.e., an evaluation method), the processor 31 of the evaluation computer 3 performs the acceptable/unacceptable judgment on the lens-to-be-measured 100 based on the eight correlation coefficients calculated in the process of Step S13. There is a possible configuration in which, for example, a predetermined threshold is previously set for the correlation coefficient, and the acceptable/unacceptable judgment may be performed only when the correlation coefficient is greater than the threshold.

In the present embodiment, the calculated eight correlation coefficients are not equally treated. As can be known from the above, among the eight distributions of the error pattern, some exhibit clear characteristics but others do not, depending on the type of the relative positional shift and rotational shift. Thus, the weighting process should be properly performed on each of the eight distributions of the error pattern. By properly performing the weighting process, accuracy of the correlation judgment can be improved.

However, in the case where relative positional shift or rotational shift is generated between the front surface 101a and the back surface 101b, the correlation between the comparison power distribution and the defective power distribution becomes high regardless of the amount of the shift, and therefore the lens will be judged defective without exception. As an extreme example, even if the rotational shift of an actual measured lens is very small (for example, the rotational shift is 0.1 degree or less), since the correlation between the comparison power distribution and the error pattern for rotational shift (see FIGS. 9A-9G) is high, the lens may be judged defective (unacceptable) even though it is a non-defective product with sufficient optical performance. In such a case, a threshold may be set for the shift amount in a range in which sufficient optical performance can be obtained.

On the other hand, although it is almost impossible to exactly know the shift amount generated between the front surface 101a and the back surface 101b from the difference distribution (the comparison power distribution) obtained based on the actually measured power distribution, it is possible to roughly estimate the shift amount from the difference distribution. This is because, as discussed above, when the shift amount increases, the variance of each of the difference distributions tends to increase.

If it is assumed that the variance of the astigmatism difference distribution is in proportion with the shift amount, then it can be concluded that the greater the variance is, the greater the shift amount is. However, since the variance is also strongly affected by the addition power in addition to the shift amount, it is preferred that an estimated value obtained by dividing the variance by the prescribed addition power is used to judge the shift amount. By using the aforesaid estimated value, the shift amount can be estimated using a value with the influence of the addition power removed therefrom, and therefore accuracy of the correlation judgment can be improved.

As can be known from the above, by providing a correlation between the comparison power distribution and the error pattern (the defective power distribution) and a suitable threshold for the estimated value of the shift amount, it is possible to efficiently detect the respective shift states between the front surface 101a and the back surface 101b, which is the object.

The eight difference distributions shown in FIG. 7 are created based on the actually measured power distribution of the lens-to-be-measured 100 in a counterclockwise-shift state. In FIG. 7, the values indicated below the eight difference distributions respectively represent the correlation coefficients with the error patterns in a counterclockwise-shift state (see FIG. 10). The estimated value (referred to as "DVA" hereinafter) obtained by Dividing the Variance of the Astigmatism difference distribution by the prescribed addition power is used as a clue in evaluating the shift amount.

The power of the lens-to-be-measured 100 based on which the eight difference distributions (comparison power distributions) are created as shown in FIG. 7 is: spherical power S: −0.25, cylindrical power C: −1.25, cylinder axis Ax: 90, and addition power ADD: 2.50. It can be known that, although the design type of the aforesaid lens-to-be-measured 100 and the design type of the lens based on which the error patterns are created as shown in FIG. 10 are different, the correlation between the eight difference distributions shown in FIG. 7 and the error patterns shown in FIG. 10 is very high. As a result, it can be concluded that the lens-to-be-measured 100 based on which the eight difference distributions shown in FIG. 7 are created has the same combined defects (shift states) as that of the lens based on which the error patterns shown in FIG. 10 are created. Thus, the processor 31 of the evaluation computer 3 judges that the result of the second lens evaluation performed on the lens-to-be-measured 100 is unacceptable.

On the other hand, FIG. 8 shows the eight difference distributions (comparison power distributions) created based on the actually measured power distribution of the lens-to-be-measured 100 where no relative positional shift is caused between the front surface 101a and the back surface 101b. In FIG. 8, the values indicated below the eight difference distributions respectively represent the correlation coefficients between the difference distributions and the error patterns in a counterclockwise-shift state (see FIG. 10). Note that, when the value of the correlation coefficient is 0 or less, it is indicated as 0. The DVA is the estimated value the variance of the astigmatism difference distribution by the prescribed addition power, and is used as a clue in evaluating the shift amount.

As can be known from FIG. 8 that, some of the eight difference distributions show high correlation with the error patterns in a counterclockwise-shift state shown in FIG. 10, but the correlation is not as high as FIG. 7, in which the eight difference distributions show more obvious correlation with the error patterns in a counterclockwise-shift state. Thus, it can be concluded that the lens-to-be-measured 100 based on which the eight difference distributions shown in FIG. 8 are created has no the same combined defects (shift states) as those of the lens based on which the error patterns shown in FIG. 10 are created.

Although the present embodiment is described using an example in which the correlation is judged to the case where there is a rotational shift, the correlation may be judged in the same manner to the case where there is a positional shift in up-down direction, left-right direction or the like. Further, if the correlation between the eight difference distributions created based on the actually measured power distribution and the error patterns (see FIGS. 10 to 13) is low, then the processor 31 of the evaluation computer 3 judges that the result of the second lens evaluation performed on the lens-to-be-measured 100 is acceptable.

Although the present embodiment is described using an example in which the acceptable/unacceptable judgment is performed to the case where there is a rotational shift, a positional shift in up-down direction, left-right direction or the like, the acceptable/unacceptable judgment may also be performed in the same manner to the case where there is a positional shift formed by combining the rotational shift, the positional shift in up-down direction, left-right direction or the like. In such a case, it is preferred that error patterns corresponding to the positional shift formed by combining the respective shifts in different directions are prepared.

Further, the evaluation using the aforesaid error patterns can not only be performed to detect the positional shift and the rotational shift, but also can be performed to, for example, detect the difference of the type of the front surface 101a and the back surface 101b even there is no positional shift and rotational shift. In such a case, it is necessary to prepare error patterns for different types of the front surface 101a and the back surface 101b.

With the aforesaid method for evaluating the optical characteristics of the lens, it is possible to not only judge whether the lens-to-be-measured 100 is a non-defective product or defective product, but also identify the type of the defect. Further, by narrowing down the processes associated with the defect, the cause of the defect can be traced.

Incidentally, the error patterns of the left lens of a pair of spectacles has a reverse distribution to the distribution of the error patterns of the right lens (i.e., the error patterns of the left lens is bilaterally symmetric to those of the right lens). Thus, if a pair of spectacles is manufactured so that the right lens and the left lens are bilaterally symmetric to each other, then the left lens can be judged using the error patterns of the right lens. However, it is preferred that the error patterns corresponding to the left lens and the error patterns corresponding to the right lens are respectively prepared for being used to perform judgment on the left lens and the right lens separately, so that the judgment may also be performed with high accuracy on a pair of spectacles in which the right lens and the left lens are not bilaterally symmetric to each other.

4. Next-Process (Step S16)

The lens-to-be-measured 100 judged acceptable in the process of Step S15 is passed to a next-process. In the next process, dyeing and various coating treatments are performed according to order requirement. Thereafter, an edging process (in which the edge of the lens is grinded) is performed so that the lens is conformed to the frame shape and the segment shape, and thereby the manufacture of the spectacle lens is completed. The manufactured spectacle lens is delivered to the customer who places the order.

With the evaluation method of the progressive-addition lens according to the present embodiment, it is possible to judge whether there is defective factor before manufacture of the bi-aspherical type progressive-addition lens is completed. Further, the defective factor can be identified by determining what kind of error pattern does the defective factor closely fit. Further, the time necessary for performing judgment and evaluation processes can be remarkably reduced by previously storing data that indicates what kind of error pattern the defective factor has. Thus, it is possible to rapidly and accurately judge whether the bi-aspherical type progressive-addition lens is defective or not and therefore effectively provide high quality products.

Incidentally, although the present embodiment is described using an example in which the progressive-addition lens is a bi-aspherical type progressive-addition lens, the present embodiment may also applied to a bi-progressive type progressive-addition lens whose both surfaces are progressive-power surfaces. Further, the present embodiment may also be applied to a lens whose both surfaces are intricately curved.

[Method for Manufacturing Progressive-addition Lens]

A method for manufacturing a progressive-addition lens using the aforesaid lens evaluation method will be described below with reference to FIG. 15.

Figure 15:
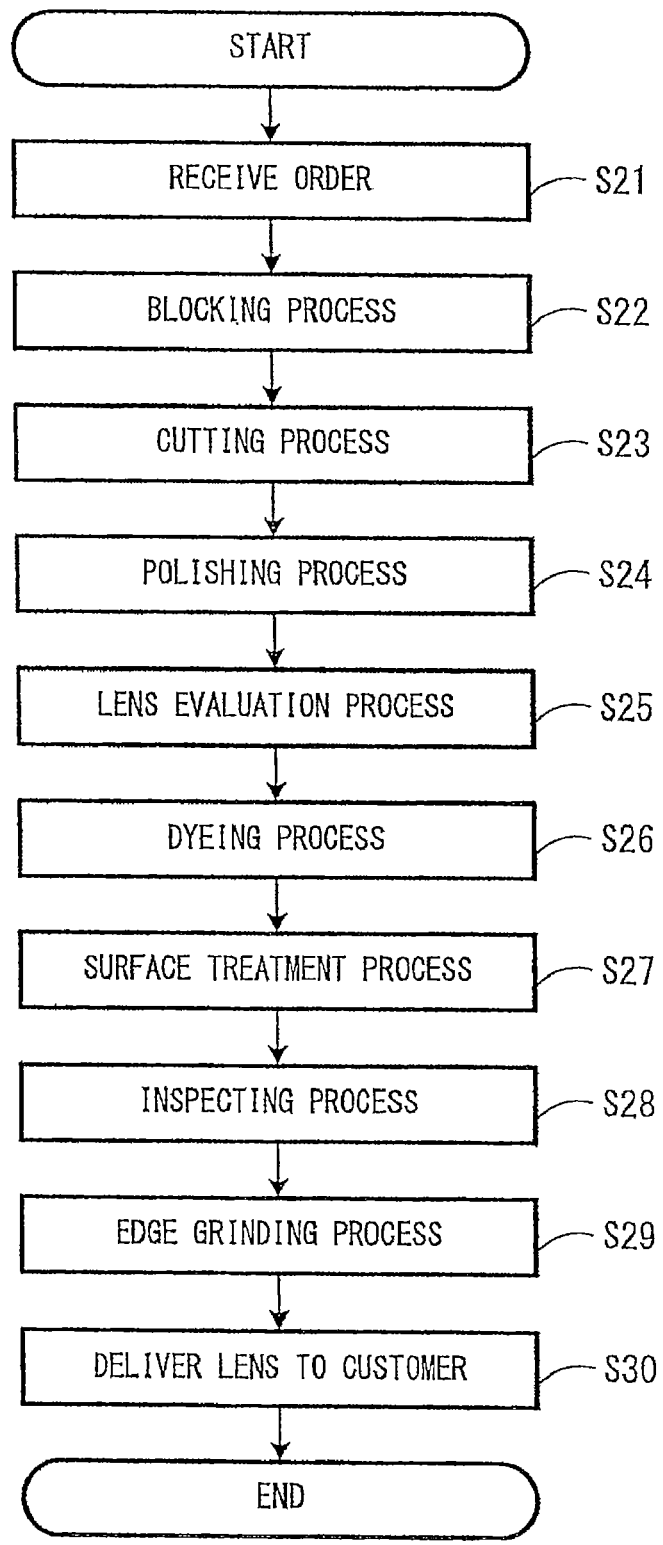
FIG. 15 is a flowchart showing a method for manufacturing a spectacle lens according to the embodiment of the present invention.

FIG. 15 is a flowchart showing steps for manufacturing a progressive-addition lens from order receipt to delivery.

First, an order of the progressive-addition lens is received (Steps S21). When an order program of the order terminal 91 of the spectacles store 9 (see FIG. 1) is started, the order terminal 91 is connected to the main server 7 through the communication media 8. Thereby an order entry screen is displayed on a display of the order terminal 91. An operator of the spectacles store 9 inputs order information with an input device of the order terminal 91, the order information including information on the spectacle lens being ordered, information on spectacle frame, prescribed values, layout information and the like.

The order information inputted from the order terminal 91 is transmitted to the main server 7 through the communication media 8. Upon receiving the order information inputted from the order terminal 91, the main server 7 executes a spectacle lens processing design program to calculate a desired lens shape including lens edge shape. If it is judged that the lens can not be manufactured based on the calculation result, then the main server 7 prompts the order terminal 91 to revise the inputted order data. While if it is judged that the lens can be manufactured based on the calculation result, then the main server 7 confirms receipt of the order.

When receipt of the order is confirmed, the order information transmitted from the order terminal 91 is stored in the order receipt data storing section 22 of the data server 2 as order receipt data. Further, when receipt of the order is confirmed, information on lens shape calculated by the spectacle lens processing design program is stored in the design data storing section 21 of the data server 2 as design data.

The spectacle lens processing design program also calculates lens processing design values for performing respective processes, and determines processing conditions (i.e., sets values of various devices, jigs to be used and the like) for processing the lens based on the processing design values. Further, the information on lens processing (the processing design values, processing conditions) is stored in the storage 20 of the data server 2 as processing data for being used to control the various devices.

In the factory, many kinds of lens blanks are previously manufactured and stocked, the lens blanks including semi-finished lens blanks (referred to as "semi-finished lens" hereinafter) with only one surface optically finished and lens blanks with both surfaces optically unfinished. A lens blank for manufacturing the lens is selected from stocked lens blanks based on the design data and processing data.

Next, the processing is passed to a blocking process (Step S22). The blocking process is a process for attaching a lens holder to both the front surface and back surface of the lens, so that the lens can be attached on a cutting device and a polishing device respectively used for performing a cutting process and a polishing process (which are to be described later).

Next, the cutting process is performed on the optically unfinished surface of the lens blank (Step S23). The cutting process is a process for cutting the surface into a predetermined surface shape with a cutting device, leaving a polishing margin. The surface shape to be cut is previously determined based on the design data and the processing data.

Next, the polishing process is performed on the cut surface (Step S24). The polishing process is a process for polishing the cut surface of the lens with the cutting device to optically finish the surface of the lens. The polishing condition is previously determined according to the processing data. The process from Step S21 to Step S24 corresponds to the pre-process shown in FIG. 3.

Next, the lens evaluation process is performed on the lens whose both surfaces having been optically finished (Step S25). Since the details about the lens evaluation process have been described with reference to FIG. 3, the description thereof will be skipped.

Next, the dyeing process is performed on the lens having been judged acceptable in the lens evaluation process of Step S25 according to necessity (Step S26). The dyeing process is a process for dyeing the lens. The lens is dyed into the color instructed by the order receipt data. In the case where a color sample is provided, the lens is dyed into a color closed to the sample. There are various dyeing methods. Examples of the dyeing methods include, for example, immersing the lens in a dye liquid for a predetermined time, and then heating the lens so that the dye immersed into the lens is diffused and stabilized inside the lens.

Incidentally, the lens unnecessary to be dyed is passed to the surface treatment process after the lens evaluation process is performed.

Next, the surface treatment process is performed on the lens (Step S27). The surface treatment process is a process for performing surface treatments such as forming a hard coat, an antireflection film, a water-spotting preventing coat, an anti-fouling film and the like. These surface treatments are performed according to the instruction given in the order receipt data.

Next, an inspecting process is performed on the lens (Step S28). In the inspecting process, the appearance of the lens, the optical characteristics at the predetermined measurement positions (for example, at the optical center) of the lens, the thickness of the lens and the like are checked. The lens meter 6 and a thickness meter (not shown) are connected to a computer for controlling the inspecting process. The computer for controlling the inspecting process compares the actually measured values at the predetermined measurement positions obtained by the lens meter 6 and the thickness meter with the lens specification based on the order receipt data and the design data to judge whether the lens is acceptable or not.

Next, an edge grinding process (an edging process) is performed on the lens (Step S29). Incidentally, if the instruction for performing the edge grinding process (the edging process) is not given in the order receipt data, then the lens is delivered to the customer who places the order after the inspecting process is completed.

In the edge grinding process (the edging process), a lens holder is attached to the lens, and the lens is cut with a grinding device so as to form an edge which fits the predetermined segment shape and the frame shape. The perimeter and shape of the edged lens are measured with a shape measuring device (not shown), and the measured results are compared with the processing data to judge whether the lens is acceptable or not. If it is judged that the lens is acceptable, the appearance, the optical characteristics and the thickness of the lens is checked again, and the acceptable lens is delivered to the customer who places the order (Step S30).

Although the lens evaluation process (Step S25) is performed immediately after the process for optically finishing the both optical surfaces in the present embodiment, the lens evaluation process may also be performed in further later step. Further, the lens evaluation process may also be performed for more than one time during the manufacturing process. Incidentally, it is preferred to perform the lens evaluation process immediately after the cutting process and polishing process, so that the difference from the design data can be found in an early stage, and therefore the lens having great difference from the design data can be prevented from being passed to the next process.

Further, according to the present invention, since the type of difference (the positional shift, the rotational shift and the like) can be grasped, the cause of the difference can be easily identified.

Further, although the prescribed power is subtracted from the actually measured dioptric power distribution and the calculation power distribution in the present embodiment, the prescribed power does not have to be subtracted.

EXPLANATION OF REFERENCE NUMERALS

1 Power distribution measuring device
2 Data server
3 Evaluation computer
4 Input means
5 Output means
6 Lens meter
7 Main server
8 Communication media
9 Spectacles store
10 Spectacle lens evaluation device
20 Storage
21 Design data storing section
22 Order receipt data storing section
23 Measured result storing section
24 Acceptable/unacceptable judgment result storing section
31 Processor
32 Storage
70 Second evaluation measurement point
91 Order terminal
92 Frame shape measuring device
100 Lens-to-be-measured
101a Front surface
101b Back surface
321 Acceptable/unacceptable reference storing section
322 Error pattern storing section

The invention claimed is:

1. A method for evaluating a progressive-addition lens comprising:
a power distribution measuring step in which powers of the progressive-addition lens at a plurality of points are measured to obtain an actually measured power distribution;
a similarity search step in which a comparison power distribution created based on the actually measured power distribution and a defective power distribution are compared with each other to perform a similarity search between the comparison power distribution and the defective power distribution, wherein the defective power distribution is a distribution for which a relative positional shift is generated between one surface and another surface of the progressive-addition lens; and
an evaluation step, performed using a processor, in which whether or not the comparison power distribution and the defective power distribution are similar to each other is determined based on the result of the similarity search step, if it is determined that the comparison power distribution and the defective power distribution are similar to each other, then the progressive-addition lens is evaluated as defective, and if it is determined that the comparison power distribution and the defective power distribution are not similar to each other, then the progressive-addition lens is evaluated as not defective.

2. The method for evaluating the progressive-addition lens according to claim 1, wherein the comparison power distribution is a difference between the actually measured power distribution and a design power distribution.

3. The method for evaluating the progressive-addition lens according to claim 1, wherein the comparison power distribution is a power distribution based on an arbitrary direction.

4. The method for evaluating the progressive-addition lens according to claim 3, wherein the arbitrary direction is a plurality of equiangularly-spaced directions.

5. The method for evaluating the progressive-addition lens according to claim 1, wherein in the similarity search step, a correlation coefficient between dioptric power of the comparison power distribution and dioptric power of the defective power distribution is calculated.

6. The method for evaluating the progressive-addition lens according to claim 5, wherein the calculation of the correlation coefficient is performed in a near portion region of the progressive-addition lens.

7. A device for evaluating a progressive-addition lens comprising:
a power distribution measuring device for measuring power of the progressive-addition lens at a plurality of measurement points to obtain an actually measured power distribution; and
an evaluation computer having a defective power distribution storage for storing a defective power distribution and a processor for evaluating the progressive-addition lens using the actually measured power distribution and the defective power distribution, the defective power distribution being a distribution for which a relative positional shift is generated between one surface and another surface of the progressive-addition lens,
wherein the processor of the evaluation computer performs: a process for creating a comparison power distribution based on the actually measured power distribution; a process for comparing the comparison power distribution and the defective power distribution with each other to perform similarity search between the comparison power distribution and the defective power distribution; and a process in which whether or not the comparison power distribution and the defective power distribution are similar to each other is determined based on the result of the similarity search, if it is determined that the comparison power distribution and the defective power distribution are similar to each other, then the progressive-addition lens is evaluated as defective, and if it is determined that the comparison power distribution and the defective power distribution are not similar to each other, then the progressive-addition lens is evaluated as not defective.

8. A method for manufacturing a progressive-addition lens comprising:

a step for optically finishing optically-unfinished surface(s) of a lens blank to form a progressive-addition lens; and a lens evaluation step for evaluating the progressive-addition lens, wherein the lens evaluation step comprises:

a power distribution measuring step in which powers of the progressive-addition lens at a plurality of points are measured to obtain an actually measured power distribution;

a similarity search step in which a comparison power distribution created based on the actually measured power distribution and a defective power distribution are compared with each other to perform a similarity search between the comparison power distribution and the defective power distribution, the defective power distribution being a distribution for which a relative positional shift is generated between one surface and another surface of the progressive-addition lens; and an evaluation step in which whether or not the comparison power distribution and the defective power distribution are similar to each other is determined based on the result of the similarity search step, and if it is determined that the comparison power distribution and the defective power distribution are similar to each other, then the progressive-addition lens is evaluated as defective, and if it is determined that the comparison power distribution and the defective power distribution are not similar to each other, then the progressive-addition lens is evaluated as not defective.

* * * * *